United States Patent
Liu

(10) Patent No.: US 11,934,848 B2
(45) Date of Patent: Mar. 19, 2024

(54) CONTROL DISPLAY METHOD AND ELECTRONIC DEVICE

(71) Applicant: Huawei Technologies Co., Ltd., Shenzhen (CN)

(72) Inventor: Zhenyu Liu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/868,446

(22) Filed: Jul. 19, 2022

(65) Prior Publication Data

US 2022/0350624 A1 Nov. 3, 2022

Related U.S. Application Data

(63) Continuation of application No. PCT/CN2021/073043, filed on Jan. 21, 2021.

(30) Foreign Application Priority Data

Jan. 21, 2020 (CN) .......................... 202010071942.4

(51) Int. Cl.
*G06F 9/455* (2018.01)
*G06F 9/451* (2018.01)

(52) U.S. Cl.
CPC .................... *G06F 9/451* (2018.02)

(58) Field of Classification Search
CPC ....... G06F 9/45529; G06F 9/543; G06F 9/546
See application file for complete search history.

(56) References Cited

U.S. PATENT DOCUMENTS

| 2002/0070977 | A1 | 6/2002 | Morcos et al. |
| 2011/0083099 | A1* | 4/2011 | Eun ........................ G06F 3/0485 |
| | | | 715/788 |
| 2014/0310647 | A1 | 10/2014 | Luan |
| 2016/0117372 | A1* | 4/2016 | Krafft ................. G06F 3/04883 |
| | | | 715/739 |
| 2016/0239156 | A1 | 8/2016 | Arutyunyan |

FOREIGN PATENT DOCUMENTS

| CN | 107783711 A | 3/2018 |
| CN | 107943359 A | 4/2018 |
| CN | 109814768 A | 5/2019 |
| CN | 110083289 A | 8/2019 |
| CN | 111309418 A | 6/2020 |

* cited by examiner

*Primary Examiner* — Andy Ho
(74) *Attorney, Agent, or Firm* — Leydig, Voit & Mayer, Ltd.

(57) ABSTRACT

A control display method includes: starting a first APP, and determining a first control of the first APP based on a first display parameter of the first APP; displaying a first display interface of the first APP, and displaying the first control in a first floating window on the first display interface; determining, based on a second display parameter of the first APP, a third control corresponding to the first APP; and displaying the third control in a second floating window on the first display interface of the first APP.

20 Claims, 17 Drawing Sheets

My Profile

User Message Notifications

CONTROL DISPLAY METHOD AND ELECTRONIC DEVICE

CROSS-REFERENCE TO RELATED APPLICATIONS

This application is a continuation of International Application No. PCT/CN2021/073043, filed on Jan. 21, 2021, which claims priority to Chinese Patent Application No. 202010071942.4, filed on Jan. 21, 2020. The disclosures of the aforementioned applications are hereby incorporated by reference in their entireties.

TECHNICAL FIELD

This application relates to the field of human-computer interaction technologies, and specifically, to a control display method and an electronic device.

BACKGROUND

To meet diversified requirements of users, terminals support increasingly more applications (APPs). In addition, to implement functions of an APP, the APP provides controls corresponding to the functions, so that the APP implements the corresponding functions by using the controls.

An APP usually has a plurality of controls. To enable the APP to display a control required by a user, some controls are usually provided in a display interface of the APP, and after receiving a touch for a control, a terminal may display an interface corresponding to the control until the control required by the user is displayed in the display interface of the APP. For example, refer to schematic diagrams of display interfaces of an APP used for communication shown in FIG. 1(a) to FIG. 1(d). FIG. 1(a) is an initial interface of the APP. To enable the APP to display a "Do Not Disturb Mode" control, the user needs to tap a "Me" control in the initial interface. Then, the terminal displays an interface shown in FIG. 1(b), and the user taps a "Settings" control in the interface. After receiving a touch operation performed on the "Settings" control, the terminal displays an interface shown in FIG. 1(c), and the user taps the "Do Not Disturb Mode" control in the interface. Then, the terminal displays an interface shown in FIG. 1(d), and the "Do Not Disturb Mode" control required by the user is displayed in the interface.

However, when this manner is applied, the user usually needs to perform a plurality of touch operations, so that the terminal can display the control required by the user. The operations are complex. For example, in the foregoing example, the user needs to sequentially touch the "Me", "Settings", and "Do Not Disturb Mode" controls in the terminal, that is, perform three touch operations, so that the terminal can display the "Do Not Disturb Mode" control. The operations are complex.

SUMMARY

To simplify operations that need to be performed by a user when an electronic device displays a control required by the user, embodiments of this application provide a control display method and an electronic device.

According to a first aspect, this application provides a control display method, including:

starting a first application APP, and determining a first control of the first APP based on a first display parameter of the first APP, where the first display parameter of the first APP includes at least one of the following: display permission for metadata corresponding to a control of the first APP, use frequency of the control of the first APP, a mapping relationship between a type of the first APP and the first control, and an interface identifier of a first display interface; and displaying the first display interface of the first APP, and displaying the first control in a first floating window on the first display interface, where the first control is different from a second control, and the second control is a control displayed in the first display interface.

According to this embodiment of this application, an electronic device can display the first floating window on an upper layer of the first display interface of the first APP based on the first display parameter of the first APP, and display, in the first floating window, a control that is of the first APP and that is not included in the first display interface, so that a larger quantity of controls are displayed. This can reduce operations that need to be performed by a user on the electronic device when a control required by the user is displayed.

In a possible implementation, the first control is a function button used to enable editing of a function of the first APP, and the displaying the first control in a first floating window on the first display interface of the first APP includes:

displaying a name and an icon of the first control in the first floating window.

The user of the electronic device can identify and distinguish between first controls based on names and icons of the first controls.

Alternatively, the first control is a function button used to enable or disable a function of the first APP, and the displaying the first control in a first floating window on the first display interface of the first APP includes:

displaying a name of the first control in the first floating window, and displaying the function as an enabled state or displaying the function as a disabled state.

Based on the name of the first control and the displayed state of the function, the user of the electronic device can identify the first control and determine a status of the function corresponding to the first control.

In a possible implementation, the method further includes:

determining, based on a second display parameter of the first APP, a third control corresponding to the first APP, where the third control is a function button for controlling an operating system of the electronic device on which the first APP is installed; and displaying the third control in a second floating window on the first display interface of the first APP.

In this embodiment of this application, the third control is a control used to control a function supported by the operating system of the electronic device. For example, the third control includes at least one of the following controls: a "WLAN" control, a global positioning system ("GPS") control, a "Bluetooth" control, an "NFC" control, a "Brightness Adjustment" control, an "Airplane Mode" control, an "Eye Comfort Mode" control, and a control indicating whether screen auto-rotation is locked.

According to the foregoing steps, the third control can be displayed in the second floating window, so that the user can perform an operation on the third control in the second floating window, to reduce user operations that need to be performed when the user requires the third control.

In a possible implementation, the second display parameter includes at least one of the following: system permission of the first APP, a system function indicated by a component of the first APP, or a mapping relationship between the type of the first APP and the third control.

The electronic device can determine, based on the second display parameter, the third control corresponding to the first APP.

In a possible implementation, the first display parameter of the first APP includes the display permission for the metadata corresponding to the control of the first APP.

The determining a first control of the first APP based on a first display parameter of the first APP includes:
  determining that at least one control that is in controls of the first APP and that corresponds to metadata having the display permission is a first target control; and
  determining that a control that is in the at least one first target control and different from the second control is the first control of the first APP.

In the foregoing manner, the electronic device can determine the first control of the first APP based on the display permission for the metadata corresponding to the control of the first APP. The display permission of the metadata corresponding to the control of the first APP may be set by a developer or a provider of the first APP, so that the first control displayed in the first floating window can meet a setting of the developer or the provider of the first APP.

In a possible implementation, the first display parameter of the first APP includes the use frequency of the control of the first APP.

The determining a first control of the first APP based on a first display parameter of the first APP includes:
  determining that at least one control that is in controls of the first APP and whose use frequency is greater than a first threshold is a second target control, or determining that first n controls that are in the controls of the first APP and that are most frequently used are second target controls, where n is a specified positive integer; and
  determining that a control that is in the at least one second target control and different from the second control is the first control of the first APP.

In the foregoing manner, the electronic device can determine the first control of the first APP based on the use frequency of the control of the first APP, so that the first control displayed in the first floating window can meet a use habit of the user, to improve use experience of the user.

In a possible implementation, the first display parameter of the first APP includes the mapping relationship between the type of the first APP and the first control.

The determining a first control of the first APP based on a first display parameter of the first APP includes:
  determining at least one third target control based on the type of the first APP and the mapping relationship between the type of the first APP and the first control; and
  determining that a control that is in the at least one third target control and different from the second control is the first control of the first APP.

In the foregoing manner, the electronic device can determine the first control of the first APP based on the mapping relationship between the type of the first APP and the first control. An implementation is simple.

In a possible implementation, the first display parameter of the first APP includes the interface identifier of the first display interface.

The determining a first control of the first APP based on a first display parameter of the first APP includes:
  determining, based on the interface identifier of the first display interface, at least one fourth target control associated with the first display interface, where the at least one fourth target control is at least one control displayed in a lower-level display interface of the first display interface when the electronic device to which the first APP is applied displays the lower-level display interface of the first display interface; and
  determining that a control that is in the at least one fourth target control and different from the second control is the first control of the first APP.

In the foregoing manner, the electronic device can determine the first control of the first APP based on the interface identifier of the first display interface. Because the first control is associated with the first display interface, when the user requires the first control associated with the first display interface, the first control associated with the first display interface can be displayed in the first floating window, to reduce touch operations of the user.

In a possible implementation, the first display parameter of the first APP includes the display permission for the metadata corresponding to the control of the first APP and the interface identifier of the first display interface.

The determining a first control of the first APP based on a first display parameter of the first APP includes:
  determining that at least one control that is in controls of the first APP and that corresponds to metadata having the display permission is a first target control;
  determining, based on the interface identifier of the first display interface, at least one fifth target control that is in the first target controls and associated with the first display interface, where the at least one fifth target control is the first target control displayed in a lower-level display interface of the first display interface when the electronic device to which the first APP is applied displays the lower-level display interface of the first display interface; and
  determining that a control that is in the at least one fifth target control and different from the second control is the first control of the first APP.

In the foregoing manner, the electronic device can determine the first control of the first APP with reference to the display permission of the metadata corresponding to the control of the first APP and the interface identifier of the first display interface. The metadata corresponding to the first control determined in this manner has the display permission, and the first control is associated with the first display interface, so that the first control can meet a setting of a developer or a provider of the first APP, and when the user requires the first control associated with the first display interface, the first control associated with the first display interface can be displayed in the first floating window, to reduce touch operations of the user.

In a possible implementation, the first display parameter of the first APP includes the use frequency of the control of the first APP and the interface identifier of the first display interface.

The determining a first control of the first APP based on a first display parameter of the first APP includes:
  determining that at least one control that is in controls of the first APP and whose use frequency is greater than a second threshold is a sixth target control, or determining that first m controls that are in the controls of the first APP and that are most frequently used are sixth target controls, where m is a specified positive integer;
  determining, based on the interface identifier of the first display interface, at least one seventh target control that is in the sixth target controls and associated with the first display interface, where the at least one seventh target control is the sixth target control displayed in a lower-level display interface of the first display interface when the electronic device to which the first APP is applied displays the lower-level display interface of the first display interface; and determining that a control that is in the at least one seventh target control and different from the second control is the first control of the first APP.

In the foregoing manner, the electronic device can determine the first control of the first APP with reference to the use frequency of the control of the first APP and the interface identifier of the first display interface. The first control determined in this manner is a control that is used frequently, so that a use habit of the user can be met. In addition, the first control is associated with the first display interface, so that when the user requires the first control associated with the first display interface, the first control associated with the first display interface can be displayed in the first floating window, to reduce touch operations of the user.

In a possible implementation, the first display parameter of the first APP includes the display permission for the metadata corresponding to the control of the first APP and the use frequency of the control of the first APP.

The determining a first control of the first APP based on a first display parameter of the first APP includes:

determining that at least one control that is in controls of the first APP and that corresponds to metadata having the display permission is a first target control;

determining that at least one control that is in the first target controls and whose use frequency is greater than a third threshold is an eighth target control, or determining that first s controls that are in the first target controls and that are most frequently used are eighth target controls, where s is a specified positive integer; and determining that a control that is in the at least one eighth target control and different from the second control is the first control of the first APP.

In the foregoing manner, the electronic device can determine the first control of the first APP with reference to the display permission for the metadata corresponding to the control of the first APP and the use frequency of the control of the first APP. The metadata corresponding to the first control determined in this manner has the display permission, and the first control is a control that is used frequently, so that a use habit of the user can be met.

In a possible implementation, before the displaying the first control in a first floating window on the first display interface of the first APP, the method further includes:

receiving a trigger operation for displaying the first floating window.

The trigger operation for displaying the first floating window includes at least one of the following: a swipe operation for a touch area, an air gesture operation, a voice input operation, or a tap operation for a first prompt icon in the first display interface.

In this manner, the electronic device can display the first control in the first floating window only after the trigger operation for displaying the first floating window is received, and does not display the first control in the first floating window at another moment, to reduce blocking of the first display interface by the first floating window.

In a possible implementation, a quantity of the first controls is M, a maximum quantity of first controls displayed in the first floating window each time is N, and if M is greater than N, the displaying the first control in a first floating window on the first display interface includes:

sorting the first controls based on sorting parameters of the first controls;

displaying first N sorted first controls in the first floating window; and displaying more first controls in the first floating window after a tap operation for a first collapse icon in the first floating window is received.

In the foregoing manner, a large quantity of first controls are not displayed in the first floating window each time, to avoid a phenomenon that an area of the first floating window is large, so as to further reduce blocking of the first display interface by the first floating window.

In a possible implementation, the sorting parameter includes at least one of the following: a sequence of obtaining, by scanning an installation package of the first APP, metadata corresponding to the first control, use frequency of the first control, or a priority of the metadata corresponding to the first control.

According to a second aspect, this application provides an electronic device, including:

one or more processors;

one or more memories; and one or more computer programs, where the one or more computer programs are stored in the one or more memories, the one or more computer programs include instructions, and when the instructions are executed by the one or more processors, the electronic device is enabled to perform the control display method according to the first aspect.

According to a third aspect, this application provides a computer-readable storage medium. The computer-readable storage medium stores instructions, and when the instructions are run on an electronic device, the electronic device is enabled to perform the control display method according to the first aspect.

According to a fourth aspect, this application provides a computer program product including an instruction. When the computer program product runs on an electronic device, the electronic device is enabled to perform the control display method according to the first aspect.

According to this embodiment of this application, the electronic device can display the first floating window at the upper layer of the first display interface of the first APP based on the first display parameter of the first APP, and the control that is of the first APP and that is not included in the first display interface is displayed in the first floating window. Compared with the conventional technology, in this embodiment of this application, more controls can be provided, so that operations that need to be performed by the user on the electronic device to display the control required by the user are reduced.

Further, in this embodiment of this application, the electronic device determines, based on the first display parameter of the first APP, the first control displayed in the first floating window. Therefore, for a same first APP, when first display parameters of the first APP are different, first controls displayed in the first floating window may also be different, so that diversified requirements of the user can be met.

DESCRIPTION OF EMBODIMENTS

The following describes technical solutions in embodiments of this application with reference to the accompanying drawings.

In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more than two.

The following terms "first" and "second" are merely intended for a purpose of description. In the descriptions of embodiments of this application, unless otherwise stated, "a plurality of" means two or more than two.

The following describes implementations of embodiments in detail with reference to accompanying drawings.

Figure 1A:
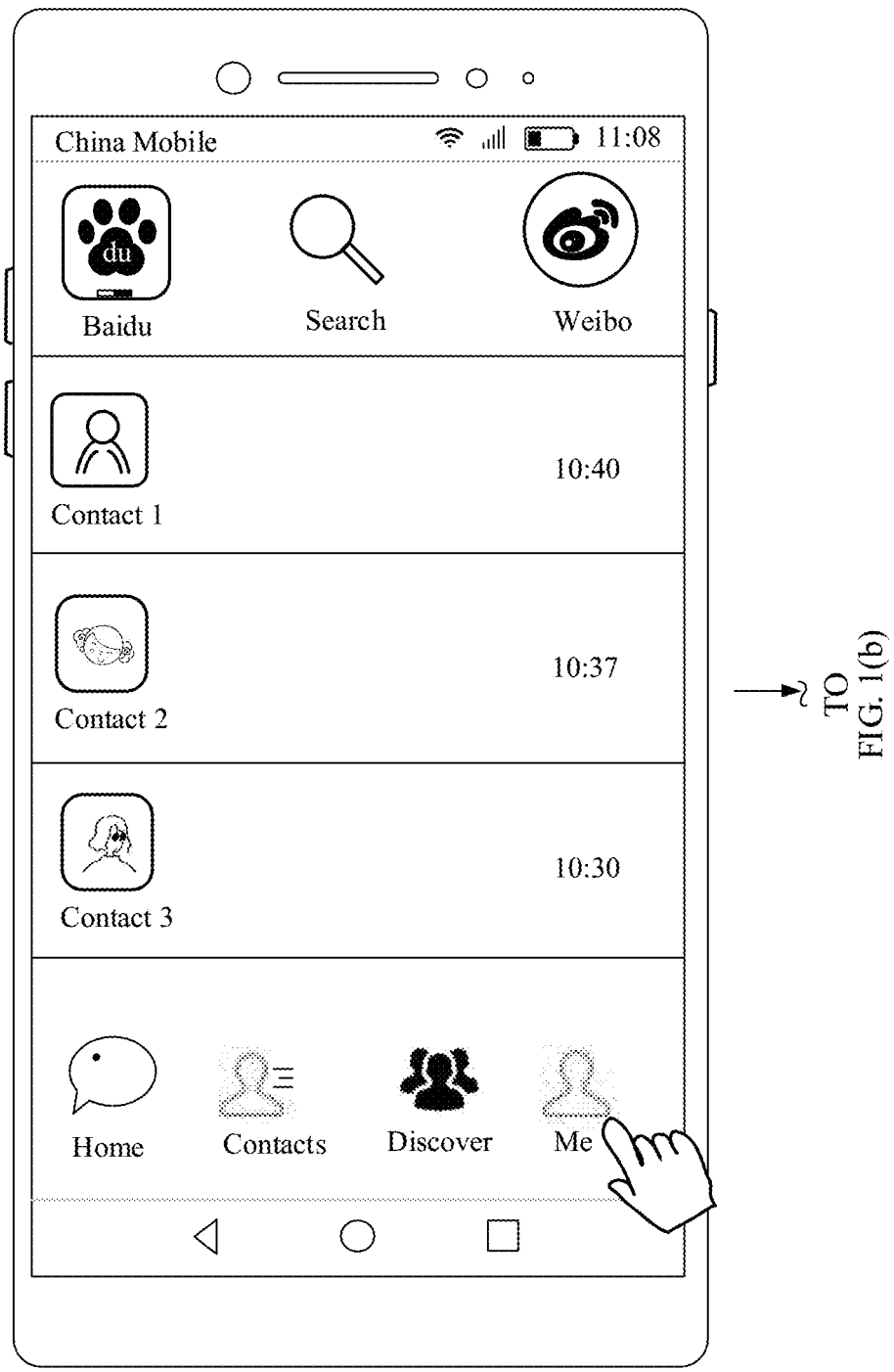
FIG. 1(a) is a schematic diagram of an interface of an APP disclosed in the conventional technology.
Figure 1B:
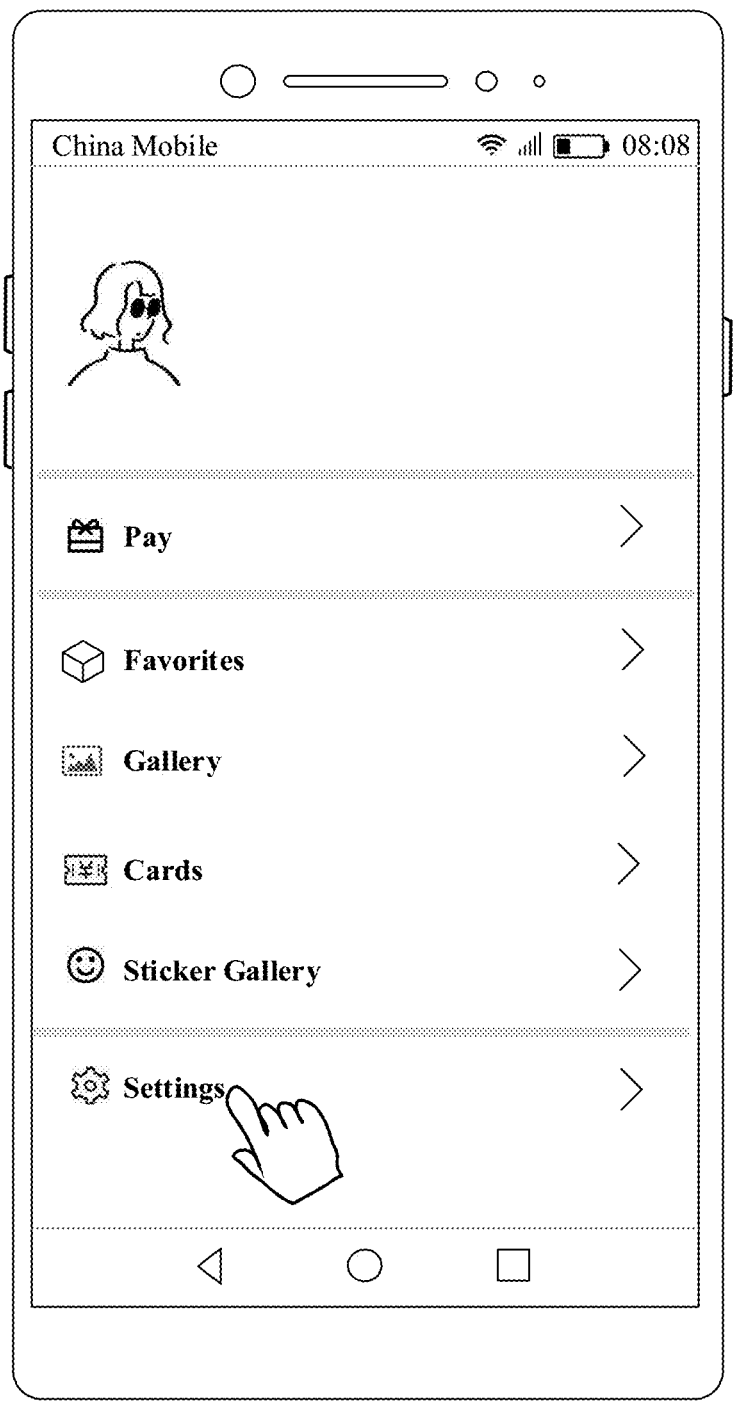
FIG. 1(b) is a schematic diagram of another interface of an APP disclosed in the conventional technology.
Figure 1C:
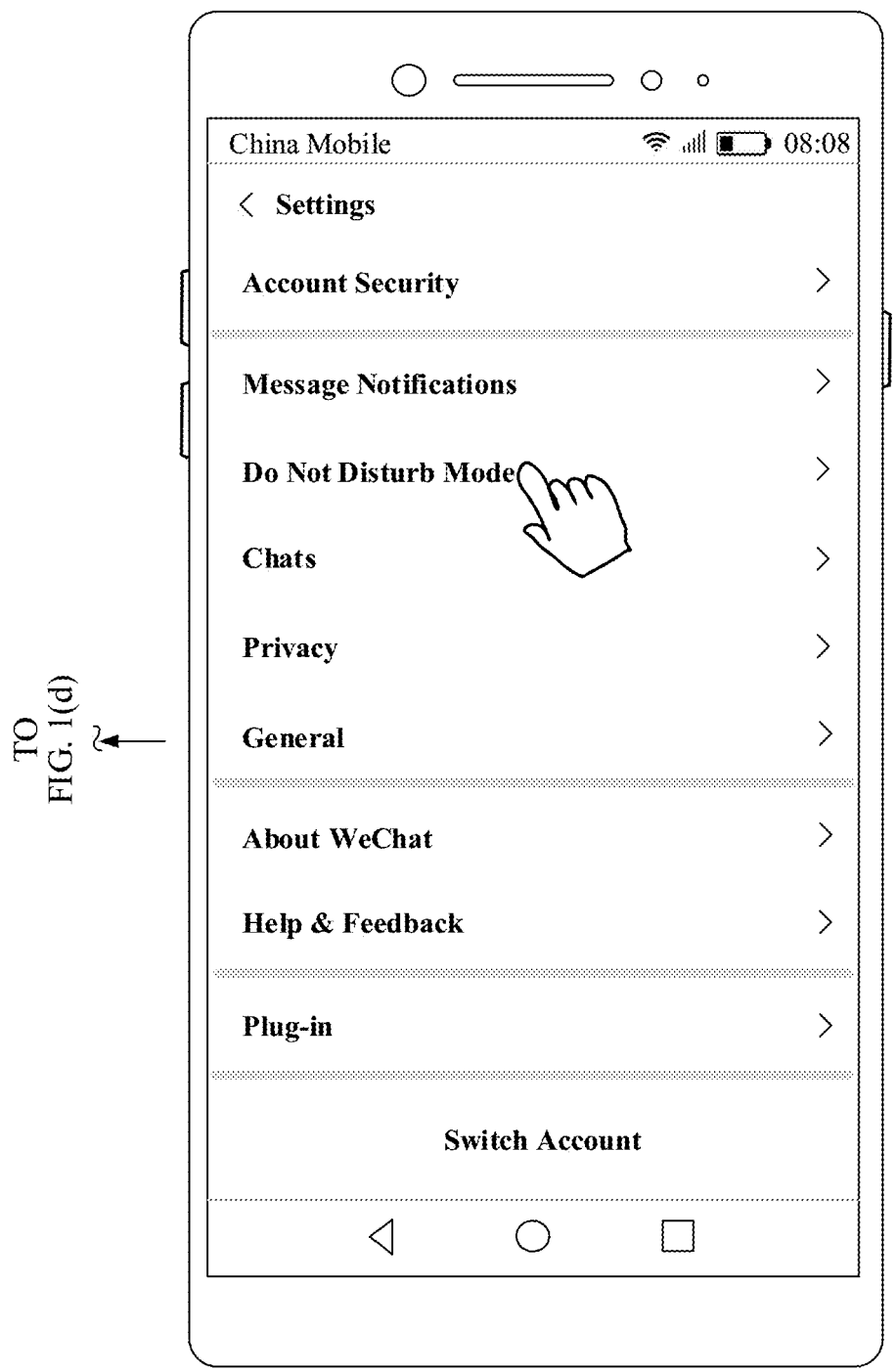
FIG. 1(c) is a schematic diagram of still another interface of an APP disclosed in the conventional technology.
Figure 1D:
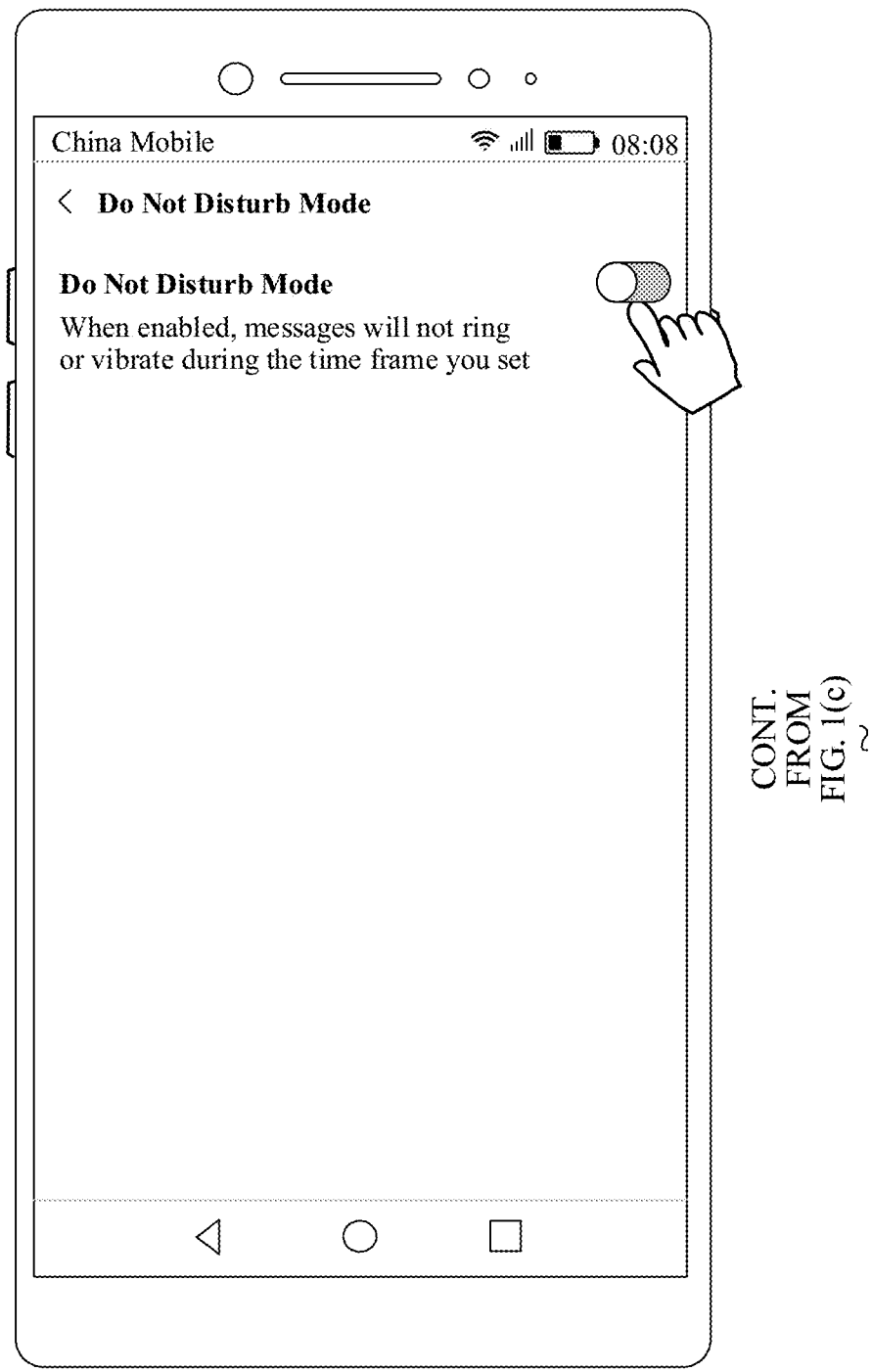
FIG. 1(d) is a schematic diagram of yet another interface of an APP disclosed in the conventional technology.
Figure 2:
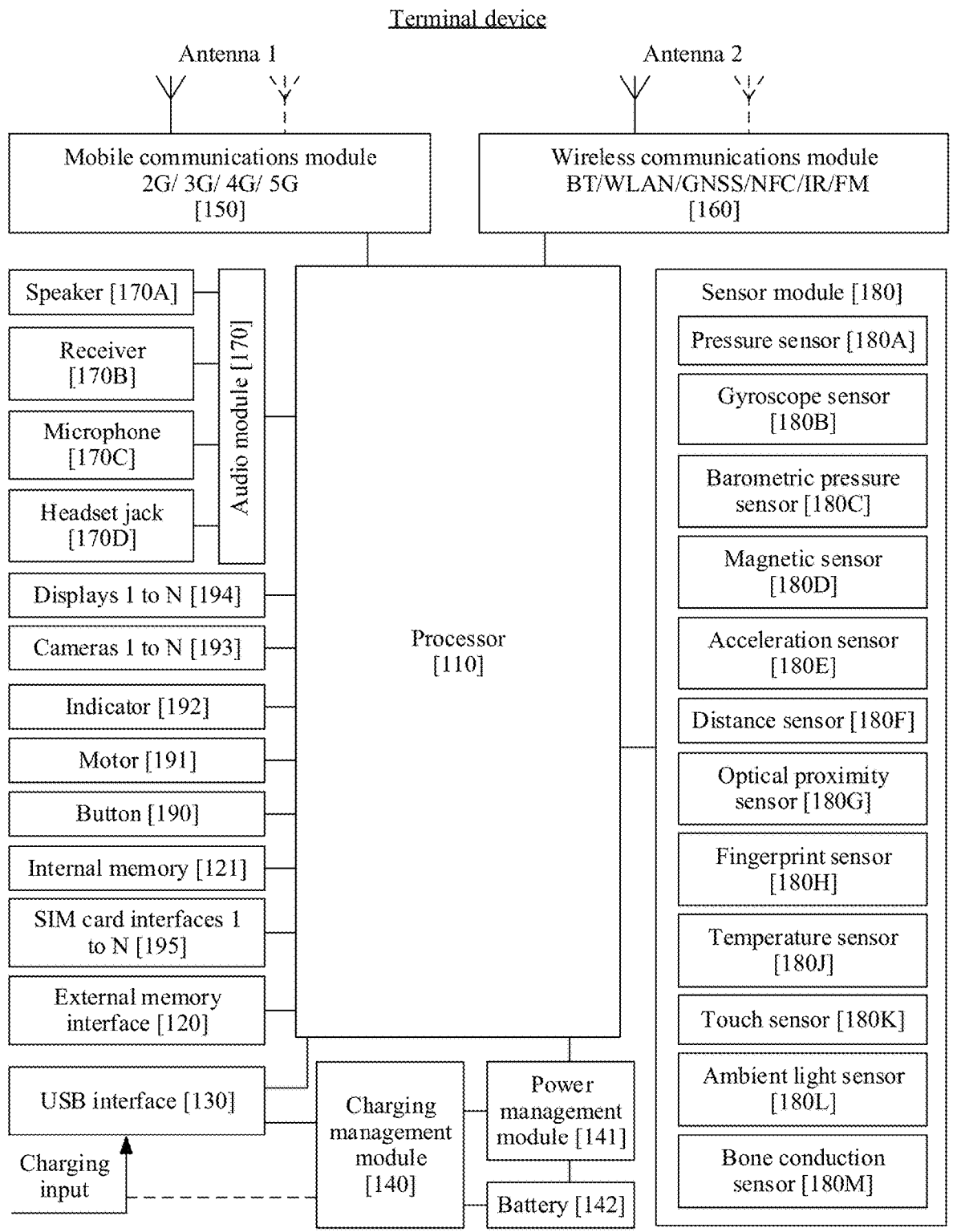
FIG. 2 is a schematic diagram of a structure of an electronic device according to an embodiment of this application.

A control display method provided in embodiments of this application may be applied to a plurality of electronic devices. In some embodiments, the electronic device may be a device on which an APP can be installed, for example, a mobile phone, a tablet computer, a desktop computer, a laptop computer, a notebook computer, an ultra-mobile personal computer (UMPC), a handheld computer, a netbook, a personal digital assistant (PDA), a wearable electronic device, and a smartwatch. A specific form of the electronic device is not specially limited in this application. In this embodiment, a structure of the electronic device may be shown in FIG. 2. FIG. 2 is a schematic diagram of the structure of the electronic device to which the control display method provided in an embodiment of this application is applied.

As shown in FIG. 2, the electronic device may include a processor 110, an external memory interface 120, an internal memory 121, a universal serial bus (USB) interface 130, a charging management module 140, a power management module 141, a battery 142, a sensor module 180, a key 190, a motor 191, an indicator 192, a camera 193, a display 194, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

Further, when the electronic device is a mobile phone, the electronic device may further include: an antenna 1, an antenna 2, a mobile communication module 150, a wireless communication module 160, an audio module 170, a speaker 170A, a receiver 170B, a microphone 170C, a headset jack 170D, and a subscriber identification module (SIM) card interface 195.

It can be understood that the structure shown in embodiments does not constitute a specific limitation on the electronic device. In some other embodiments, the electronic device may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. Different processing units may be independent components, or may be integrated into one or more processors. A memory may be further disposed in the processor 110, and is configured to store instructions and data.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The charging management module 140 is configured to receive a charging input from a charger. The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like.

The mobile communication module 150 may provide a solution that is applied to the electronic device and that includes wireless communication technologies such as 2G, 3G, 4G, and 5G. The wireless communication module 160 may provide a solution, applied to the electronic device, to wireless communication including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. In some embodiments, in the electronic device, the antenna 1 and the mobile communication module 150 are coupled, and the antenna 2 and the wireless communication module 160 are coupled, so that the electronic device can communicate with a network and another device by using a wireless communication technology.

The electronic device implements the display function by using the graphical processing unit (GPU), the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute instructions to generate or change display information.

The display 194 is configured to display an image, a video, and the like. The display 194 includes a display panel. A series of graphical user interfaces (GUI) may be displayed on the display 194 of the electronic device, and all these GUIs are of a home screen of the electronic device.

The electronic device may implement an image shooting function by using the ISP, the camera 193, the video codec, the GPU, the display 194, the application processor, and the like.

The external memory interface 120 may be configured to connect to an external storage card, for example, a micro SD card, to extend a storage capability of the electronic device. The external memory card communicates with the processor 110 through the external memory interface 120, to implement a data storage function. The internal memory 121 may be configured to store computer-executable program code. The executable program code includes instructions. The processor 110 runs the instructions stored in the internal memory 121, to perform various function applications of the electronic device and data processing.

The electronic device may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A. The receiver 170B, also referred to as an "earpiece", is configured to convert an audio electrical signal into a sound signal. The microphone 170C, also referred to as "mike" or "mic", is configured to convert a sound signal into an electrical signal. When making a call or sending a voice message, the user may make a sound near the microphone 170C through the mouth, to enter a sound signal to the microphone 170C. The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The gyroscope sensor 180B may be configured to determine a motion posture of the electronic device. The barometric pressure sensor 180C is configured to measure barometric pressure. The magnetic sensor 180D includes a Hall effect sensor. The electronic device may detect opening and closing of a flip cover by using the magnetic sensor 180D. The acceleration sensor 180E may detect accelerations in various directions (usually on three axes) of the electronic device. The distance sensor 180F is configured to measure a distance. The optical proximity sensor 180G may include a light-emitting diode (LED) and an optical detector. The ambient light sensor 180L is configured to sense ambient light brightness. The fingerprint sensor 180H is configured to collect a fingerprint. The temperature sensor 180J is configured to detect a temperature. The touch sensor 180K may also be referred to as a touch panel or a touch-sensitive surface. The touch sensor 180K may be disposed on the display 194, and the touch sensor 180K and the display 194 constitute a touchscreen, which is also referred to as a "touchscreen". The bone conduction sensor 180M may obtain a vibration signal. The button 190 includes a power button, a volume button, and the like. The button 190 may be a mechanical button, a touch button, or a virtual button. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

In addition, an operating system runs above the foregoing components, for example, an iOS operating system developed by Apple, an Android open-source operating system developed by Google, and a Windows operating system developed by Microsoft. An application may be installed and run in the operating system.

To clarify functional operations performed by each software architecture in the electronic device when the electronic device performs a solution disclosed in this application, embodiments of this application further provide a software structure of the electronic device.

The operating system of the electronic device may use a layered architecture, an event-driven architecture, a micro-kernel architecture, a micro service architecture, a cloud architecture, or the like. In embodiments of this application, an Android system with a layered architecture is used as an example to describe the software structure of the electronic device.

Figure 3:
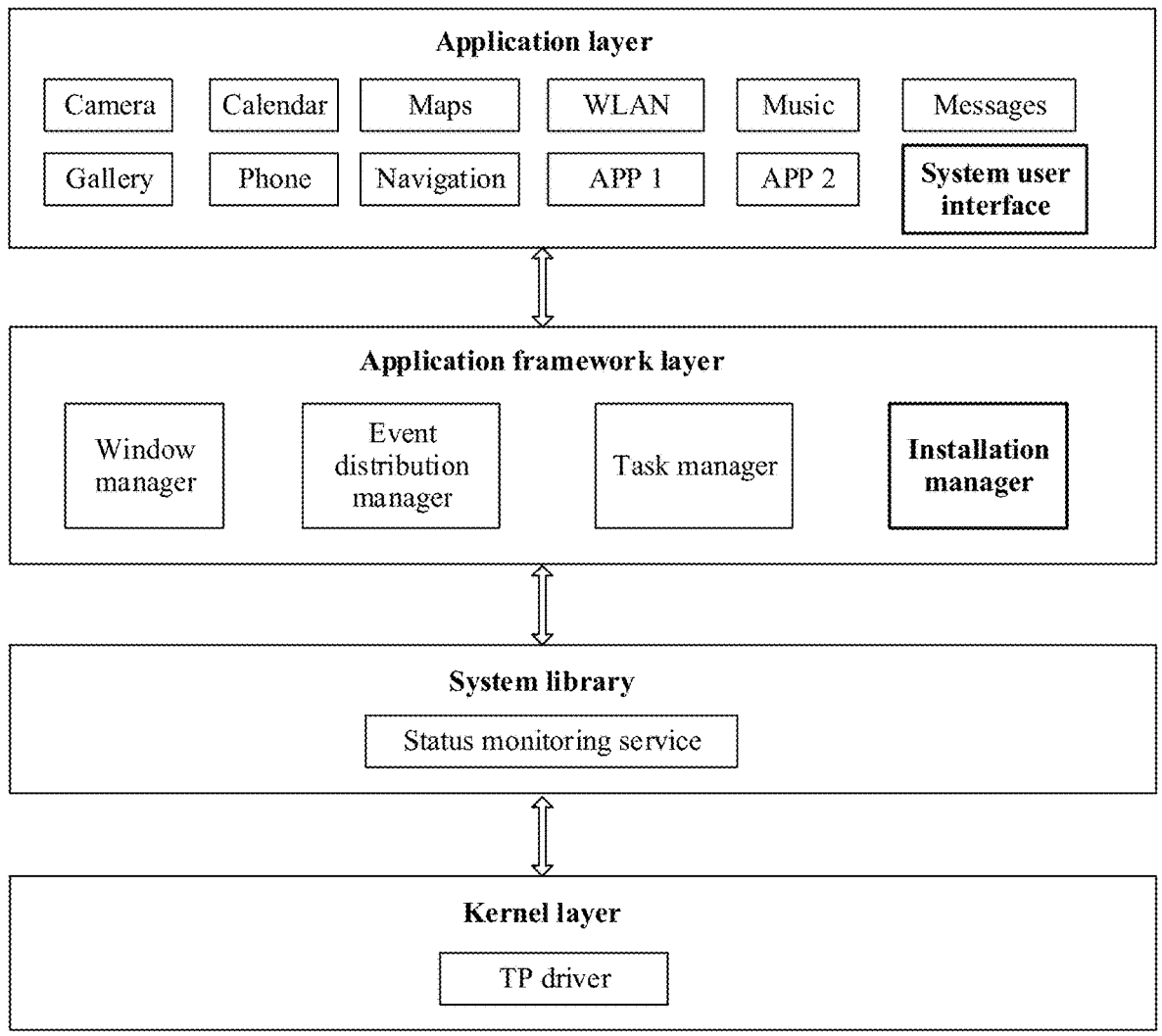
FIG. 3 is a schematic diagram of a block diagram of a software structure of an electronic device according to an embodiment of this application.

FIG. 3 is a diagram of an example of a block diagram of a software structure of an electronic device according to an embodiment of this application.

In a layered architecture, software is divided into several layers, and each layer has a clear role and task. The layers communicate with each other through a software interface. In some embodiments, an Android system is divided into four layers: an application layer, an application framework layer, a system library, and a kernel layer from top to bottom.

The application layer may include a series of application packages. As shown in FIG. 3, the application packages may include applications such as Camera, Gallery, Calendar, Phone, Map, Navigation, WLAN, Bluetooth, Music, Videos, and Messages. The application may include an application of an APP that is installed on the electronic device by default at delivery, and may further include an application installed by a user in a process of using the electronic device. For example, in the process of using the electronic device by the user, if applications such as Dianping and WeChat are installed on the electronic device, the application layer further includes application packages of the applications such as Dianping and WeChat.

Further, in embodiments of this application, the application layer further includes a system user interface (namely, a system UI). The system UI is used to manage a user interface, and may provide display of status bar information (for example, display identifiers such as a remaining battery power, a Wi-Fi signal, and a 3G/4G identifier), notification panel display, a screen capturing service, a wallpaper service, and the like. In this application, the system UI may display a control of an APP in a display interface of the APP based on the APP currently started on the electronic device.

The application framework layer provides an application programming interface (application programming interface, API) and a programming framework for an application at the application layer. The application framework layer includes some predefined functions. As shown in FIG. 3, the application framework layer may include a window manager, an event distribution manager, and a task manager. In this embodiment of this application, the application framework layer may provide an API related to control display for the application layer.

The task manager is configured to determine related information of each program and process that run in the electronic device. The event distribution manager sends an event to a corresponding module, so that the module performs subsequent processing. The window manager is configured to manage a window program. In this application, the window manager may determine a touch area of the electronic device.

Further, the application framework layer further includes an installation manager. The installation manager may also be referred to as a package manager service (PMS). The PMS is configured to install an Android application package (APK) of an APP. In addition, the PMS scans the APK in an installation process. The PMS can obtain and record information related to the APP by scanning the APK.

In addition, the system UI may interact with the task manager to determine a currently displayed APP of the electronic device. In addition, the system UI may further interact with the installation manager to obtain information that is about the currently displayed APP and recorded by the installation manager, determine a control of the APP based on the information about the APP, and display the control of the APP in an interface of the APP. For example, the system UI may display a floating window on the display interface of the APP, and display the control of the APP through the floating window. In addition, the control displayed in the floating window is a control that is not included in the current display interface.

The PMS can obtain a component of the APP and metadata of the component by scanning the APK of the APP.

The APP includes a plurality of components. For example, an APP of an Android system usually includes the following components: an activity component, a service component, a content component, an intent component, a broadcast receiver component, and a notification component. In addition, one APP may include one or more activity components, and one activity component is usually presented as a visualized user interface. For example, an activity component may be presented as a menu item list, some pictures, or the like. In addition, the service component may be configured to execute some tasks of the electronic device in a background of the electronic device. Metadata, also called trunk data, is used to define data and describe data attributes. Metadata of a component is used to describe component attributes.

In this embodiment of this application, the PMS can scan the information about the APP by scanning the APK of the APP. The information about the APP usually includes the component of the APP, the metadata of the component, and the like. Specifically, the information about the APP usually includes an activity component and a service component of the APP. Correspondingly, the metadata of the component usually includes metadata of the activity component and metadata of the service component of the APP.

The system UI interacts with the PMS to obtain the information that is about the APP and obtained by scanning by the PMS. In this case, the system UI may determine the metadata included in the information about the APP, and determine, based on a description of the component for the metadata, a name of a control corresponding to the metadata.

In addition, the control of the APP may be a function button used to enable editing of or enable/disable a function of the APP. For example, if an APP includes a "Personal Information" control, and the control is used to enable editing of personal information (such as a profile picture and a personal introduction) of the user, the control is a function button for enabling editing of a function of the APP. Alternatively, if an APP includes a "User Message Notifications" control, and the control is used to enable or disable a user message notification function of the APP, the control is a function button for enabling or disabling a function of the APP.

When the control is a function button for enabling editing of a function of the APP, the system UI may further determine, based on the description of the component for the metadata, an icon of the control corresponding to the metadata, and display a name and the icon of the control in a first floating window. The first floating window is set at an upper layer of the interface of the APP. For example, the system UI may display a name and an icon of the "Personal Information" control through the first floating window.

When the control is a function button for enabling or disabling a function of the APP, the system UI may further interact with the APP by using an API set in the application framework layer, to obtain a status of the function corresponding to the control. The status of the function corresponding to the control includes a function-enabled state and a function-disabled state. In addition, the system UI displays a name of the "User Message Notifications" control in the first floating window, and displays the function as the enabled state or displays the function as the disabled state.

In addition, the information about the APP obtained by scanning by the PMS may further include system permission of the APP. The system permission of the APP is permission that needs to be provided by an operating system of the electronic device in a running process of the APP. Correspondingly, the system UI may determine and display a control corresponding to the system permission.

For example, when system permission of an APP includes "control near field communication", the system UI may determine that controls corresponding to the APP include a control related to near field communication (NFC). Then, the system UI may determine, based on a description of the system permission in a component, a name and an icon of the control related to the NFC.

Further, the APK may further include other information, for example, may further include a priority of each piece of metadata. In this case, the information that is about the APP and obtained by the PMS by scanning the APK may further include the priority of each piece of metadata.

The system library includes a status monitoring service, and the status monitoring service may perform status detection based on data reported by a sensor driver at the kernel layer.

The kernel layer is a layer between hardware and software. The kernel layer includes a driver, and the driver may include the sensor driver.

It should be noted that, although this embodiment of this application is described by using the Android system as an example, a basic principle in this embodiment is also applicable to an electronic device based on an operating system, for example, iOS or Windows.

When the block diagram of the software structure of the electronic device is shown in FIG. 3, if a touch operation is received in a touch area of the electronic device, a sensor (for example, a pressure sensor or a temperature sensor) corresponding to the touch area outputs data corresponding to the touch operation. After receiving the data, a touch panel (TP) driver at the kernel layer reports the data to the status monitoring service in the system library. The status monitoring service determines touch location coordinates in the touch area based on the received data, and reports the touch location coordinates to the event distribution manager at the application framework layer. The event distribution manager transmits the touch location coordinates to the window manager. The window manager determines a type (for example, tap, side swipe, or pull-down) of the current touch operation and a specific touch location based on the touch location coordinates. Then, the window manager performs a corresponding operation based on the type of the current touch operation and the specific touch location.

In this case, when an APP needs to be installed on the electronic device, the user may touch an application market APP installed on the electronic device, and select the currently to-be-installed APP from a plurality of APPS provided by the application market. The electronic device downloads an installation package of the APP and installs the APP. In addition, after the electronic device receives a touch operation for the application market APP, the event processor reports a current touch event of the application market APP to the window manager, the window manager then feeds back the touch event to the application market APP, and the application market APP invokes the PMS to trigger the PMS to install the currently to-be-installed APP. After being triggered, the PMS scans the APK of the APP, and obtains and records information about the APP, so that the system UI determines a control of the APP based on the related information.

In addition, after the APP is installed, when the APP needs to perform an operation, the electronic device further receives a corresponding operation for the APP. When the operation is a touch operation for a control displayed in the system UI, the event manager reports, to the window manager, an event of receiving the touch operation for the control. The window manager triggers the system UI, and the system UI determines a touch location based on touch point coordinates, determines, based on the touch location, an application to which the touched control belongs, and then notifies the application, so that the application responds to the touch operation.

In this embodiment of this application, concepts of "first APP" and "first control of the first APP" are further involved. The following separately describes the two concepts.

A first APP is installed in the electronic device to which the control display method disclosed in this embodiment of this application is applied. According to a solution disclosed in this embodiment of this application, the electronic device can set a floating window at an upper layer of a display interface of the first APP, and display a control of the first APP through the floating window. The floating window may be referred to as a first floating window. When a control is displayed in the display interface of the first APP, a control displayed in the first floating window is different from the control displayed in the display interface. In this embodiment of this application, a control of the first APP displayed in the first floating window is referred to as a first control of the first APP, a control of the first APP displayed in the display interface is referred to as a second control, and the first control and the second control are different controls of the first APP.

In this embodiment of this application, the electronic device may install and use the first APP. The first APP may be an APP installed when the electronic device is delivered from a factory, or may be an APP installed by the user based on a requirement of the user in an application process of the electronic device. The first APP supports at least two controls, and the control may be a function button used to enable editing of or enable or disable a function of the first APP. In addition, the control of the first APP is defined by an application developer of the first APP.

When the electronic device receives a selection operation for a control of the first APP, the first APP implements a corresponding function. When a control is a function button used to enable editing of a function of the first APP, and a selection operation for the control is received, the first APP enters an interface for enabling editing of the function corresponding to the control, so that the user completes editing based on a requirement of the user. In addition, when the control is displayed in the first floating window and the display interface of the first APP, a name and an icon of the control are usually displayed. For example, when the first APP includes a "Personal Information" control, and the "Personal Information" control is a control used to edit personal information of the user, referring to a schematic diagram shown in FIG. 4(a), when the control is displayed, a name and an icon of the "Personal Information" control are usually displayed.

Figure 4A:
FIG. 4(a) is a schematic diagram of a control of a first APP according to an embodiment of this application.
Figure 4B:
FIG. 4(b) is a schematic diagram of another control of a first APP according to an embodiment of this application.

When a control is a function button used to enable or disable a function of the first APP, and a selection operation for the control is received, the first APP enables or disables the function corresponding to the control. In addition, when the control is displayed in the first floating window and the display interface of the first APP, a name of the control is usually displayed, and the function is displayed as the enabled state or the function is displayed as the disabled state. For example, when the first APP includes a "User Message Notifications" control, and the "User Message Notifications" control is used to enable or disable a user message notification function, referring to a schematic diagram shown in FIG. 4(b), when the control is displayed, a name of the "User Message Notifications" control is usually displayed, and the function is displayed as the enabled state or the function is displayed as the disabled state. In FIG. 4(b), the "User Message Notifications" control is in the disabled state, indicating that the first APP disables the user message notification function.

In an example, the first APP is a Dianping APP, and the APP provides a plurality of control interfaces. Different control interfaces may provide different controls of the first APP. The controls corresponding to the control interfaces of the first APP may be shown in FIG. 5(a).

Figure 5A:
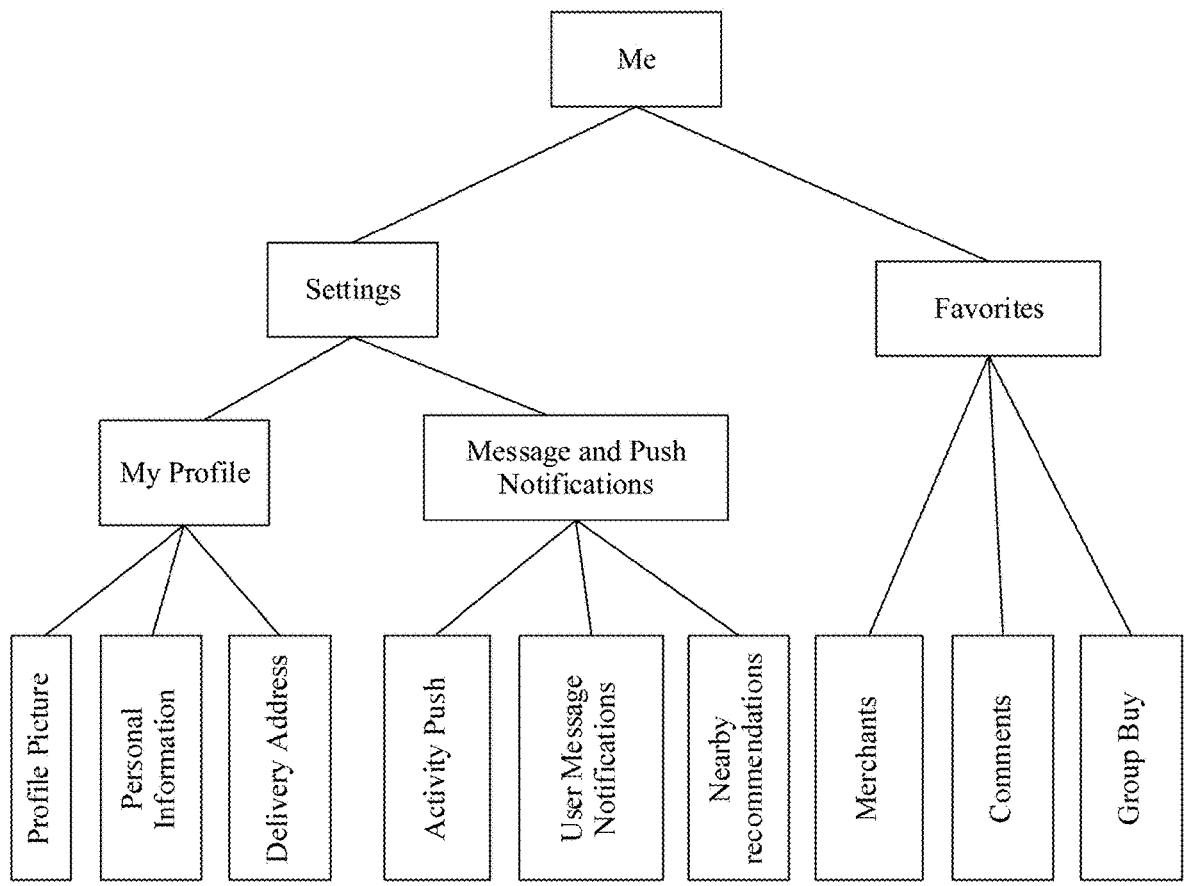
FIG. 5(a) is a schematic diagram of a first control of a first APP according to an embodiment of this application.

FIG. 5(a) indicates that a "My" control is displayed in an initial interface of the Dianping APP. The initial interface is an interface displayed when the electronic device starts the APP but does not perform an operation on the APP. After receiving a selection operation for the "My" control, the Dianping APP displays another interface, and the interface includes a "Settings" control and a "Favorites" control. After receiving a selection operation for the "Settings" control, the Dianping APP displays another interface again, and a "Personal Information" control and a "Message and Push Notifications" control are displayed in the interface. After receiving a selection operation for the "Personal Information" control, the Dianping APP displays another interface again. Controls related to personal information are displayed in the interface, for example, controls such as a "Profile Picture", "Personal Information", and "Delivery Address".

In addition, when the "Personal Information" control and the "Message and Push Notifications" control are displayed in the interface, if a selection operation for the "Message and Push Notifications" control is received, the Dianping APP displays another interface again. Controls related to message and the push notifications are displayed in the interface, for example, controls such as "Activity Push", "User Message Notifications", and "Nearby recommendations".

When the displayed interface of the Dianping APP includes the "Settings" control and the "Favorites" control, if a selection operation for the "Favorites" control is received, an interface displayed by the Dianping APP usually includes controls related to favorites, for example, controls such as "Merchants", "Comments", and "Group Buy".

The foregoing controls are used to control functions of the Dianping APP. The "Profile Picture" control is used to adjust a user profile picture displayed in the Dianping APP. The "Personal Information" control is used to determine the personal information of the user. The "Delivery Address" control is used to determine a delivery address of the user. The "Activity Push" control is used to indicate whether to receive activity push information. The "User Message Notifications" control is used to indicate whether to receive a user message. The "Near recommendations" control is used to indicate whether to receive recommendations of nearby merchants. The "Merchants" control is used to display merchant information in favorites of the APP. The "Comments" control is used to display comment information in favorites of the APP. The "Group Buy" control is used to display group buy information in favorites of the APP.

Refer to FIG. 5(a). In this example, the foregoing controls, for example, the "My" control, the "Settings" control, the "Favorites" control, the "Personal Information" control, the "Message and Push Notifications" control, the "Profile Picture" control, the "Personal Information" control, the "Delivery Address" control, the "Activity Push" control, the "User Message Notifications" control, the "Nearby recommendations" control, the "Comments" control, and the "Group Buy" control are controls of the Dianping APP.

In another example, the first APP is a WeChat APP, and the APP provides a plurality of control interfaces. Different control interfaces may provide different controls of the first APP. The controls corresponding to the control interfaces of the first APP may be shown in FIG. 5(b).

Figure 5B:
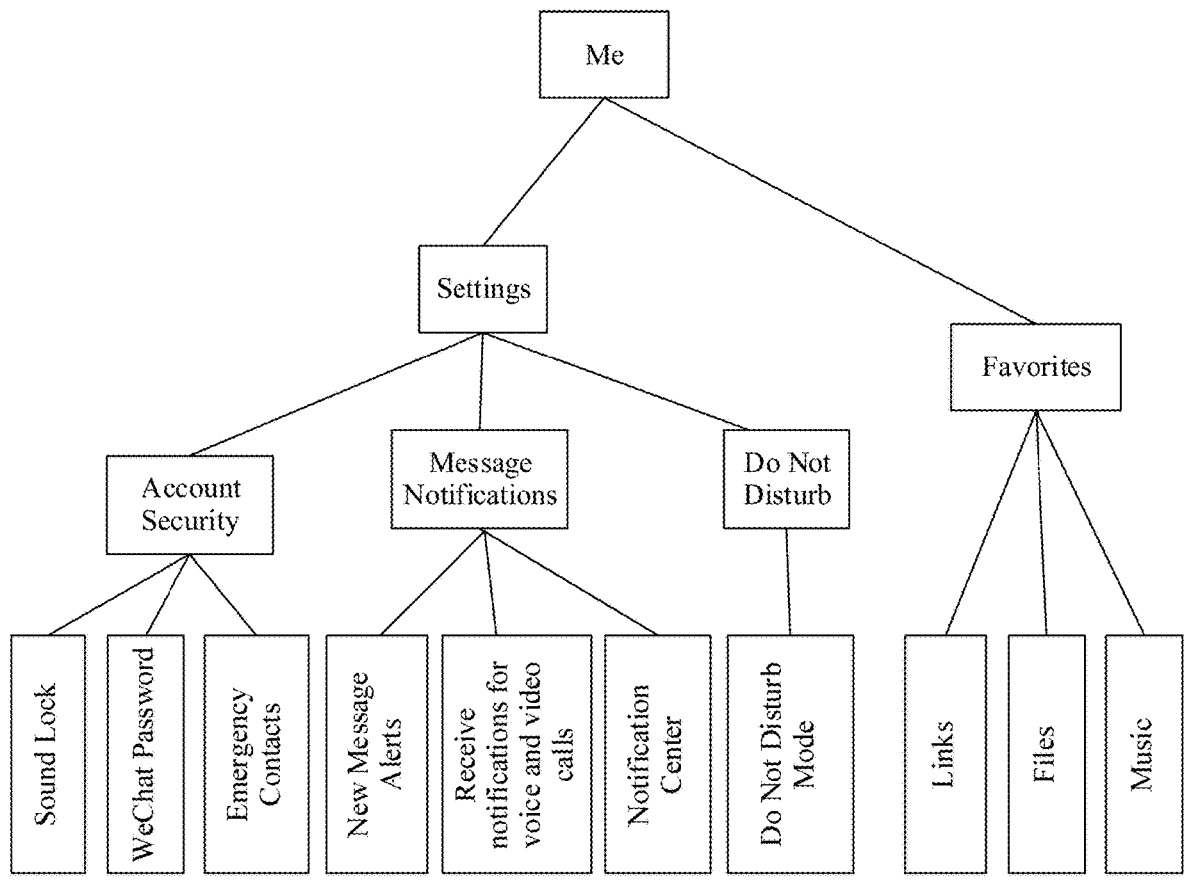
FIG. 5(b) is a schematic diagram of a first control of another first APP according to an embodiment of this application.

FIG. 5(b) indicates that a "Me" control is displayed on an initial interface of the WeChat APP. After receiving a selection operation for the "Me" control, the WeChat APP displays another interface, and the interface includes a "Settings" control and a "Favorites" control. After receiving a selection operation for the "Settings" control, the WeChat APP displays another interface again, and the interface displays an "Account Security" control, a "Message Notifications" control, and a "Do Not Disturb" control. After receiving a selection operation for the "Account Security" control, the WeChat APP displays another interface again. Controls related to account and security are displayed in the interface, for example, controls such as a "Sound Lock", a "WeChat Password", and an "Emergency Contacts".

In addition, when the "Account Security" control, the "Message Notifications" control, and the "Do Not Disturb" control are displayed in the interface, if a selection operation for the "Message Notifications" control is received, the WeChat APP displays another interface again. Controls related to message notifications, for example, controls such as "New Message Alerts", "Receive notifications for voice and video calls", and "Notification Center", are displayed in the interface.

When the "Account Security" control, the "Message Notifications" control, and the "Do Not Disturb" control are displayed in the interface, if a selection operation for the "Do Not Disturb" control is received, the WeChat APP displays another interface again, and a "Do Not Disturb Mode" control is displayed in the interface.

When the displayed interface of the WeChat APP includes the "Settings" control and the "Favorites" control, if a selection operation for the "Favorites" control is received, an interface displayed by the WeChat APP usually includes controls related to favorites, for example, controls such as "Links", "Files", and "Music".

The foregoing controls are used to control functions of the WeChat APP. The "Sound Lock" control is used to set a sound lock of the WeChat APP. The "WeChat Password" control is used to adjust a WeChat password. The "Emergency Contacts" control is used to determine a contact method of an emergency contact. The "New Message Alerts" control is used to indicate whether to receive a new message. The "Receive notifications for voice and video calls" control is used to indicate whether the WeChat APP receives notifications for voice and video calls. The "Notification Center" control is used to indicate whether to notify the user of a sender and a content abstract of a new message when the new message is received. The "Do Not Disturb Mode" control is used to indicate whether to enter a do not disturb mode, and when the WeChat APP enters the do not disturb mode and is not running in a foreground, the WeChat APP does not ring or vibrate after receiving a new message, to avoid disturbing the user. The "Links" control is used to display a link of the WeChat APP in favorites. The "Files" control is used to display a file of the WeChat APP in favorites. The "Music" control is used to display music of the WeChat APP in favorites.

Refer to FIG. 5(b). In this example, the foregoing controls, for example, the "Me" control, the "Settings" control, the "Favorites" control, the "Account Security" control, the "Message Notifications" control, the "Do Not Disturb" control, the "Sound Lock" control, the "WeChat Password" control, the "Emergency Contacts" control, the "New Message Alerts" control, the "Receive notifications for voice and video calls" control, the "Notification Center" control, the "Do Not Disturb Mode" control, the "Links" control, the "Files" control, and the "Music" control, are controls of the WeChat APP.

Certainly, the first APP may alternatively be another APP, and correspondingly, the control of the first APP may alternatively be another control. This is not limited in this embodiment of this application.

Further, in this embodiment of this application, when displaying the first control through the first floating window on the first display interface, the electronic device may further display a third control corresponding to the first APP. In addition, the third control is usually displayed through a floating window disposed in a display interface, and the floating window for displaying the third control may be referred to as a second floating window. The following describes the third control.

The third control is a function button for controlling the operating system of the electronic device, and the second floating window for displaying the third control may not only be provided by the first APP, but also be provided by the operating system. The operating system of the electronic device usually supports a plurality of functions, and a control used to control a function supported by the operating system of the electronic device is the third control.

For example, the electronic device may support connection to a wireless local area network (WLAN). The electronic device needs to be configured with a "WLAN" control, and whether the electronic device is connected to the wireless network is controlled through the "WLAN" control. The electronic device may support a location function. Correspondingly, the electronic device needs to be configured with a "Location" control, for example, a "GPS" control, and whether the electronic device enables a GPS function to implement positioning is controlled through the "Location" control. In addition, the electronic device may further support a Bluetooth function. The electronic device may be configured with a "Bluetooth" control, and whether the electronic device enables a Bluetooth function is controlled through the "Bluetooth" control. When the electronic device supports a near field communication (NFC) function, the electronic device may be further configured with an "NFC" control, and the "NFC" control is used to control whether the electronic device enables the near field communication function. In this case, each of the "WLAN" control, the "GPS" control, the "Bluetooth" control, and the "NFC" control may be referred to as a third control.

Certainly, the third control may further include another control, for example, a "Brightness Adjustment" control, an "Airplane Mode" control, an "Eye Comfort Mode" control, or a control for determining whether screen auto-rotation is locked. This is not limited in this embodiment of this application.

In this embodiment of this application, the third control is usually located in the second floating window disposed in the display interface of the first APP. The first floating window in which the first control is displayed and the second floating window in which the third control is displayed may be different floating windows, or may be a same floating window.

To clarify a solution disclosed in this application, the following uses a specific application scenario as an example.

In scenario 1, after the electronic device starts the first APP, the electronic device automatically sets the first floating window at an upper layer of the first display interface of the first APP without another operation of the user, and displays the first control of the first APP through the first floating window. A first display parameter of the first APP includes at least one of the following: display permission for metadata corresponding to the control of the first APP, use frequency of the control of the first APP, a mapping relationship between a type of the first APP and the first control, and an interface identifier of the first display interface. A specific meaning of each first display parameter and a manner of determining the first control based on each first display parameter are described below.

A control displayed in the first display interface of the first APP may be referred to as a second control, and the first control and the second control are different controls. To be specific, a control that is not included in the first display interface of the first APP is displayed through the first floating window. The first display interface of the first APP is a currently opened and displayed display interface of the first APP.

After the electronic device installs the first APP, an icon and a name of the first APP are usually displayed on a home screen of the electronic device for selection by the user. When the user needs to apply the first APP, the user may tap the icon of the first APP displayed on the home screen.

After receiving a tap operation for the icon of the first APP, the electronic device starts the first APP and displays the first display interface of the first APP. The first display interface may include some operable controls (namely, second controls). In addition, the electronic device automatically displays the first floating window at the upper layer of the display interface of the first APP, and displays the first control of the first APP in the first floating window. The first control is different from the control displayed in the first display interface.

In this scenario, the first floating window is displayed at the upper layer of the first display interface, and the first floating window includes the first control that is not displayed in the first display interface. Therefore, when viewing the first display interface, the user may view the first control displayed in the first floating window and the second control displayed in the first display interface.

In addition, the first control is a function button used to enable editing of a function of the first APP, and displaying the first control in the first floating window on the first display interface of the first APP includes: displaying a name and an icon of the first control in the first floating window. Alternatively, the first control is a function button used to enable or disable a function of the first APP, and displaying the first control in the first floating window on the first display interface of the first APP includes: displaying, in the first floating window, a name and a status of the first control, and displaying the function as the enabled state or displaying the function as the disabled state.

When the first floating window includes a control currently required by the user, the user may directly perform an operation on the control in the first floating window, for example, open the first control or close the first control. After receiving an operation for a first control in the first floating window, the electronic device executes a function corresponding to the operation.

In the conventional technology, the user usually needs to tap controls of the first APP for a plurality of times, so that the electronic device can display the first control required by the user.

However, in the scenario 1 disclosed in this application, after the electronic device starts the first APP, the electronic device automatically displays the first floating window at the upper layer of the first display interface of the first APP, and displays the first control through the first floating window. The first control is different from the second control displayed in the first display interface. Compared with the conventional technology, in a solution of this application, more selectable controls are provided for the user through the first floating window, so that operations performed by the user on controls of the first APP when the user requires a control can be reduced. That is, user operations required to display the control of the APP are simplified.

For example, when the first control displayed in the first floating window includes a control currently required by the user, the user may directly perform an operation on the first control, so that the required control can be obtained without tapping controls for a plurality of times.

Further, in this embodiment of this application, the electronic device determines, based on the first display parameter of the first APP, the first control displayed in the first floating window. Therefore, for a same first APP, when first display parameters of the first APP are different, first controls displayed in the first floating window may also be different, so that diversified requirements of the user can be met.

For example, when it is determined, based on a user requirement, that the user expects to display several controls in the first floating window, display permission of metadata corresponding to the several controls may be adjusted, so that the several controls can be displayed in the first floating window.

In some exemplary embodiments, in this scenario, when a large quantity of first controls can be displayed in the first floating window, the first controls that can be displayed in the first floating window may be divided into at least two groups, and one group of first controls and a first collapse icon may be displayed in the first floating window. When a touch operation for the first collapse icon is received, the remaining group of first controls are selected and displayed in the first floating window.

The remaining group of first controls may replace the previously displayed first controls. That is, only one group of first controls are displayed in the first floating window each time. When the last group of first controls are displayed in the first floating window, the electronic device adjusts the first collapse icon to a first return icon. After a touch operation for the first return icon is received, the previous group of first controls are displayed in the first floating window. Alternatively, when a touch operation for the first collapse icon is received, the currently displayed first controls and the remaining group of first controls may be displayed.

In this manner, the first controls can be displayed in the first floating window in a grouping manner. A larger quantity of first controls displayed in the first floating window usually indicates a larger area of the first floating window. However, when the area of the first floating window is large, content in the display interface of the first APP may be blocked. In the foregoing manner, a large quantity of first controls are not displayed in the first floating window each time, to reduce blocking of the display interface by the first floating window.

In this case, when the first floating window does not include the first control required by the user, the electronic device may adjust, by using a received touch operation for the first collapse icon, the first control displayed in the first floating window, so that the first control displayed in the first floating window meets the user requirement.

Further, in this case, if the first control required by the user is not displayed in the current first floating window, the user needs to perform a touch operation on the first collapse icon. However, in some cases, compared with the conventional technology, in a solution of this application, the user needs to perform only a small quantity of touch operations, and this can still simplify the user operations.

For example, when the first APP is the WeChat APP, a relationship between the control of the first APP and each control interface is shown in FIG. 5(a). When the user needs to perform an operation on the "Notification Center" control, the user needs to tap three controls in sequence: "Me", "Settings", and "Message Notifications", and then the "Notification Center" control is displayed in the interface of the WeChat APP, so that the user performs the operation on the "Notification Center" control. In other words, in the conventional technology, the electronic device may be enabled to display the "Notification Center" control only after the user taps three controls consecutively.

However, in this embodiment of this application, when the "Notification Center" control belongs to a first group of first controls displayed in the first floating window, the first control required by the user may be displayed in the first floating window without touching the first collapse icon by the user. When the "Notification Center" control belongs to a second group of first controls displayed in the first floating window, and the first group of first controls are displayed in the first floating window, the "Notification Center" control is displayed in the first floating window through only one touch operation performed by the user on the first collapse icon. When the "Notification Center" control belongs to a third group of first controls displayed in the first floating window, and the first group of first controls are displayed in the first floating window, the "Notification Center" control is displayed in the first floating window through only two touch operations performed by the user on the first collapse icon. Therefore, compared with the conventional technology, operations that need to be performed by the user are simplified.

Further, in this scenario, when displaying the first control of the first APP through the first floating window, the electronic device may further display, in the second floating window on the first display interface of the first APP, a third control corresponding to the first APP. The third control is a function button for controlling the operating system of the electronic device on which the first APP is installed. In addition, the first floating window and the second floating window may be different floating windows, or may be a same floating window. This is not limited in this embodiment of this application.

The electronic device usually determines, based on a second display parameter of the first APP, the third control corresponding to the first APP. The second display parameter includes at least one of the following: system permission of the first APP, a system function indicated by a component of the first APP, or a mapping relationship between the type of the first APP and the third control.

When the first floating window and the second floating window are different floating windows, the electronic device may display the second floating window while displaying the first floating window. When receiving a trigger operation for displaying the second floating window, the electronic device displays the second floating window. The trigger operation for displaying the second floating window may be a touch operation, a voice input operation, an air gesture operation, or the like for the electronic device. The touch operation may be a swipe operation (for example, a pull-down swipe operation or a left-right swipe operation) for the touch area, or may be a tap operation for a specified icon. This is not limited in this embodiment of this application.

In the conventional technology, a setting icon corresponding to the third control is provided on the home screen of the electronic device. After a tap operation for the setting icon is received, the electronic device displays a setting page. The setting page provides a plurality of types of third controls, so that the user selects a currently required third control and performs an operation on the selected third control.

However, when this manner is applied to perform an operation on the third control, the user first needs to switch the first APP to be running in the background, so that the electronic device displays the home screen, and then the user taps a "Settings" control on the home screen, so that the electronic device displays a setting page including the third control. Then, the user can perform an operation on the third control included in the setting page. In this way, operations are complex.

However, in the scenario 1 disclosed in this application, when the first control is displayed through the first floating window on the first display interface, the third control may also be displayed through the second floating window on the first display interface, and the user may directly operate the third control displayed in the second floating window.

Therefore, when the user operates the third control according to this embodiment of this application, the first APP does not need to be switched as a background operation. Compared with the method for displaying the third control in the conventional technology, this can simplify the user operations.

Figure 6A:
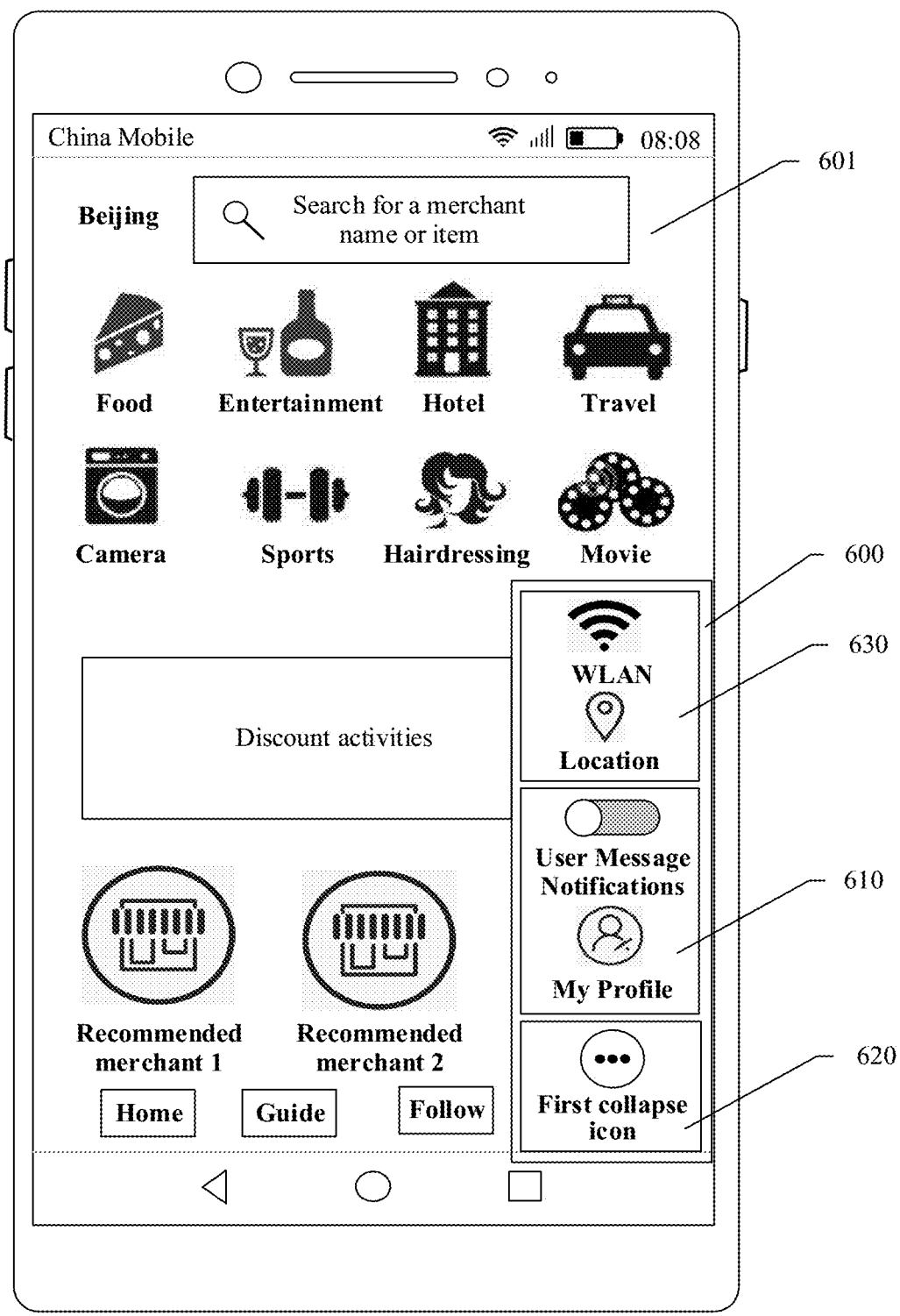
FIG. 6(a) is a schematic diagram of an interface in a control display method according to an embodiment of this application.

For example, in this scenario, after opening the first APP, that is, starting the first APP, the electronic device automatically sets the second floating window at the upper layer of the first display interface of the first APP. When the first control and the third control are displayed in a same floating window, a schematic diagram of an interface displayed by the electronic device may be shown in FIG. 6(a). In FIG. 6(a), in addition to a first display interface 601 of the first APP, a first floating window 600 is also included in an upper layer of the first display interface. The first floating window 600 and the second floating window are a same floating window. A first control 610 of the first APP, a first collapse icon 620, and a third control 630 are displayed in the first floating window 600.

In FIG. 6(a), the first control 610 includes a "User Message Notifications" control and a "Personal Information" control, and the third control 630 includes a "WLAN" control and a "Location" control. Certainly, in an actual application process, another first control and another third control may alternatively be displayed in the first floating window. This is not limited in this embodiment of this application.

When the first control displayed in the first floating window includes a first control currently required by the user, the user taps the first control. After receiving a tap operation for the first control, the electronic device performs a function corresponding to the first control. For example, when the tapped first control is an "Activity Push" control, and the current tap operation is to enable the "Activity Push" control, the first APP subsequently displays an activity push message to the user.

Further, when the first control displayed in the first floating window does not include the first control currently required by the user, the user taps the first collapse icon 620. After receiving a tap operation for the first collapse icon 620, the electronic device displays another first control in the first floating window for selection by the user.

In addition, when the third control displayed in the first floating window includes a third control currently required by the user, the user may tap the third control. Correspondingly, after receiving a tap operation for the third control, the electronic device also performs a function corresponding to the third control.

Figure 6B:
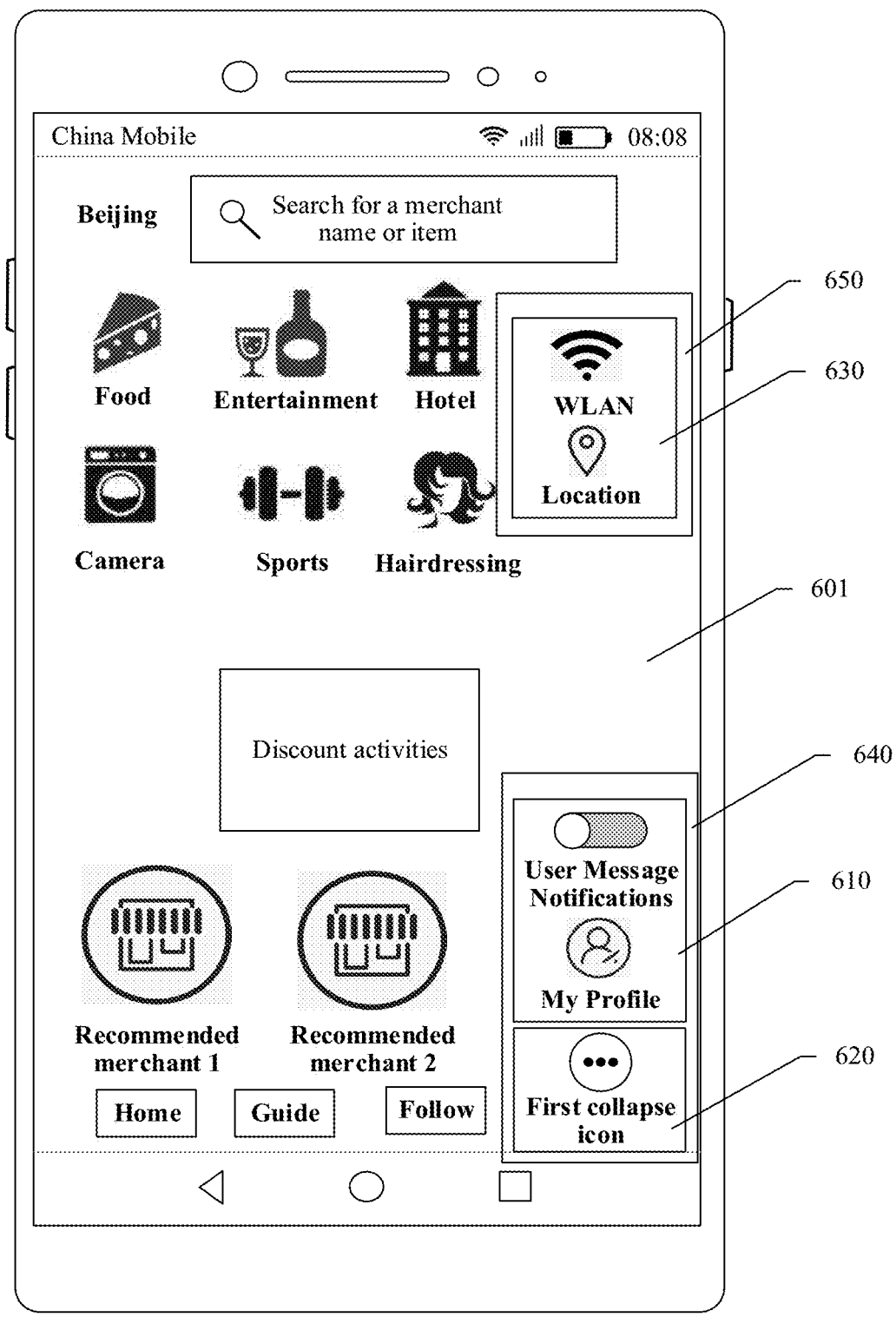
FIG. 6(b) is a schematic diagram of another interface in a control display method according to an embodiment of this application.

In another example, the first control and the third control may be located in different floating windows. In this case, a schematic diagram of an interface displayed by the electronic device may be shown in FIG. 6(b). In FIG. 6(b), in addition to the first display interface 601 of the first APP, a first floating window 640 and a second floating window 650 are also included in an upper layer of the first display interface. A first control 610 and a first collapse icon 620 are displayed in the first floating window 640, and a third control 630 is displayed in the second floating window 650.

In addition, in FIG. 6(a) and FIG. 6(b), an interface of an APP is displayed on a display of the electronic device. In other words, the interface of the first APP is displayed on the electronic device in a full-screen manner. In an actual application process, interfaces of at least two different APPs may be simultaneously displayed on the display of the electronic device. In this case, a first floating window and a second floating window that correspond to each APP may be disposed at an upper layer of a display interface of the APP, a first control of the APP is displayed through the first floating window corresponding to the APP, and a third control of the APP is displayed through the first floating window corresponding to the APP. In addition, the first floating window and the second floating window that correspond to each APP may be a same floating window, or may be different floating windows.

Figure 6C:
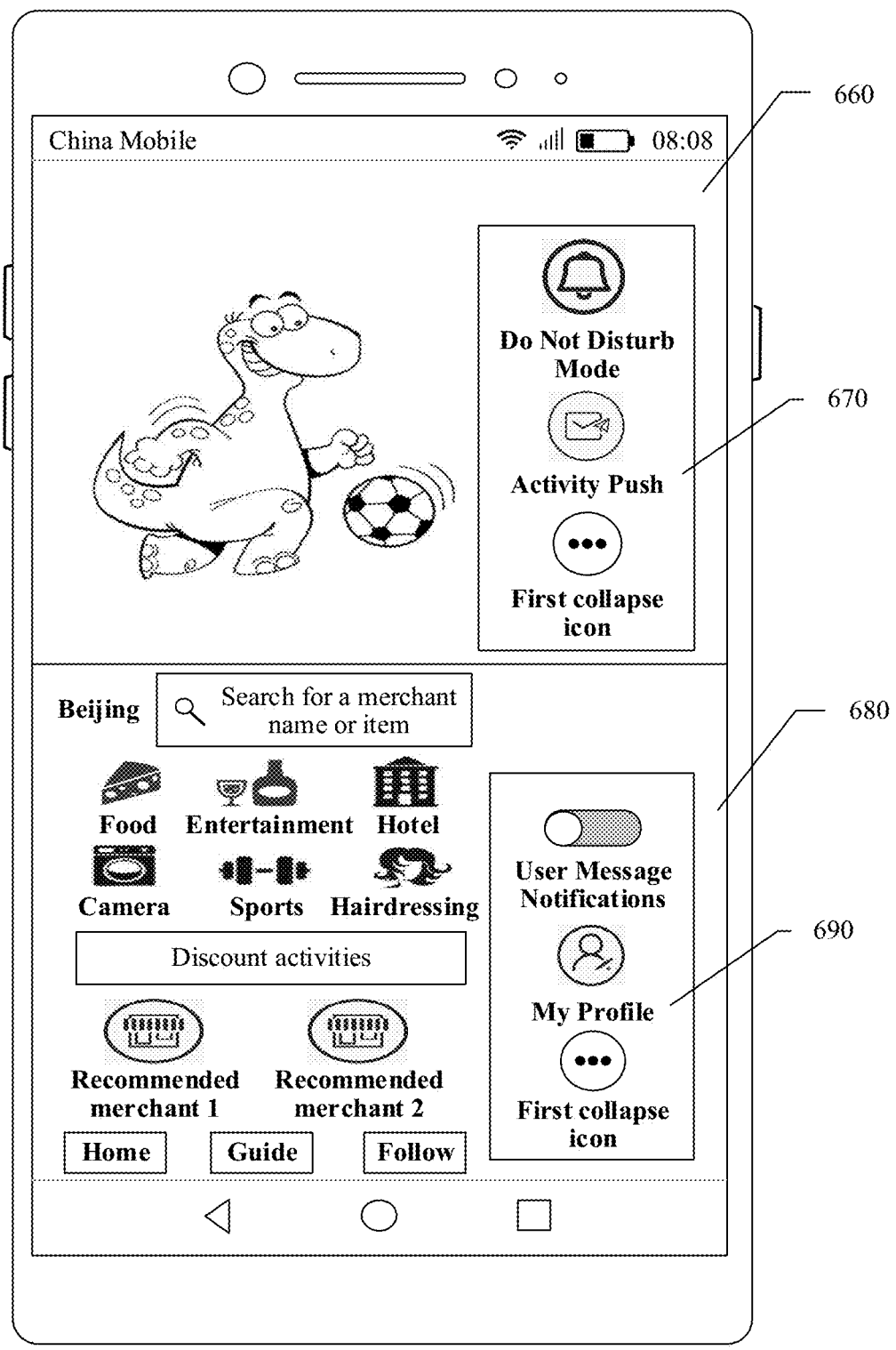
FIG. 6(c) is a schematic diagram of still another interface in a control display method according to an embodiment of this application.

For example, when the electronic device simultaneously displays display interfaces of two APPs, the two APPs are a first APP and a second APP, and a first floating window and a second floating window corresponding to each of the two APPs are a same floating window, a schematic diagram of an interface displayed by the electronic device may be shown in FIG. 6(c). In FIG. 6(c), a first display interface 660 of the first APP is included, and an animation video is displayed in the first display interface 660 in this example. In addition, a first floating window 670 corresponding to the first APP is further included in an upper layer of the first display interface 660, and a first control and a first collapse icon of the first APP are displayed in the first floating window 670. The first control includes an "Activity Push" control. In addition, in this example, the first floating window 670 of the first APP is the same as a second floating window of the first APP, and a third control corresponding to the first APP may be further displayed in the first floating window 670. The third control includes a "Do Not Disturb Mode" control. In addition, in FIG. 6(c), a second display interface 680 of the second APP is further included. Options such as merchants, food, and entertainment recommended to the user are displayed in the second display interface. In addition, a first floating window 690 corresponding to the second APP is further included in an upper layer of the second display interface 680, and a first control and a first collapse icon of the second APP are displayed in the first floating window 390. The first control of the second APP includes a "User Message Notifications" control and a "My Profile" control. In addition, a third control of the second APP may also be displayed at the upper layer of the second interface 680 through a second floating window.

In scenario 2, when the electronic device starts the first APP and receives a trigger operation for displaying the first floating window, the electronic device displays the first control of the first APP through the first floating window. The first floating window is located at an upper layer of the first display interface of the first APP. Same as that in scenario 1, the first control is determined based on a first display parameter of the first APP.

A control displayed in the first display interface of the first APP may be referred to as a second control, and the first control displayed in the first floating window is different from the second control.

In this scenario, when the user needs to perform an operation on a control, and the control required by the user is not displayed in the first display interface of the first APP, the user may perform a trigger operation on the electronic device. After the electronic device receives the trigger operation, the first control of the first APP is displayed in the first floating window.

The trigger operation for displaying the first floating window may be an operation in a plurality of forms. For example, the trigger operation for displaying the first floating window includes at least one of the following: a swipe operation for the touch area, an air gesture operation, a voice input operation, or a tap operation for a first prompt icon in the first display interface.

For example, the operation for displaying the first floating window may be a swipe operation for the touch area of the electronic device, and the touch operation may be a pull-down swipe operation or a left-right swipe operation in the touch area. Alternatively, to reduce a possibility of false triggering, the touch operation may be a rare swipe operation. For example, refer to a schematic diagram shown in FIG. 7(*a*). The touch operation is a touch operation of sliding from a lower right corner of the touch area to an upper left corner of the touch area.

A sensor, for example, a temperature sensor, a pressure sensor, and/or a capacitive sensor, is usually built in the touch area of the electronic device. When the user touches the touch area of the electronic device, different effects such as vibration and/or acoustic may be generated. The generated effect enables a sensor built in the electronic device to generate a corresponding signal, for example, a temperature signal generated by the temperature sensor, a pressure signal generated by the pressure sensor, and a capacitance signal generated by the capacitive sensor. The electronic device determines touch point coordinates of the touch operation in the touch area based on the signal generated by the sensor, and determines, based on the touch point coordinates, whether the received touch operation is a pull-down operation or a side-swipe operation. In this case, when determining that the swipe operation performed by the user on the touch area is a pull-down swipe operation or a left-right swipe operation, the electronic device displays the first floating window, and displays the first control of the first APP through the first floating window.

In another example, the trigger operation for displaying the first floating window may further be a corresponding voice input operation. In this case, a voice collection apparatus (for example, a microphone) of the electronic device collects a voice sent by the user, performs recognition processing on the voice, and determines, based on a result of the recognition processing, whether the first floating window needs to be displayed. For example, after the user sends a voice of "display the first floating window", the electronic device may display the first floating window, and display the first control through the first floating window.

Alternatively, in another example, the trigger operation for displaying the first floating window may be a specific gesture operation. The gesture operation may be an air gesture operation. In this case, the electronic device may collect, by using an image collection apparatus (for example, a camera), a gesture image including the air gesture operation. When determining, by analyzing and processing the gesture image, that the air gesture operation performed by the user is a specific gesture operation, the electronic device displays the first floating window including the first control.

Figure 7A:
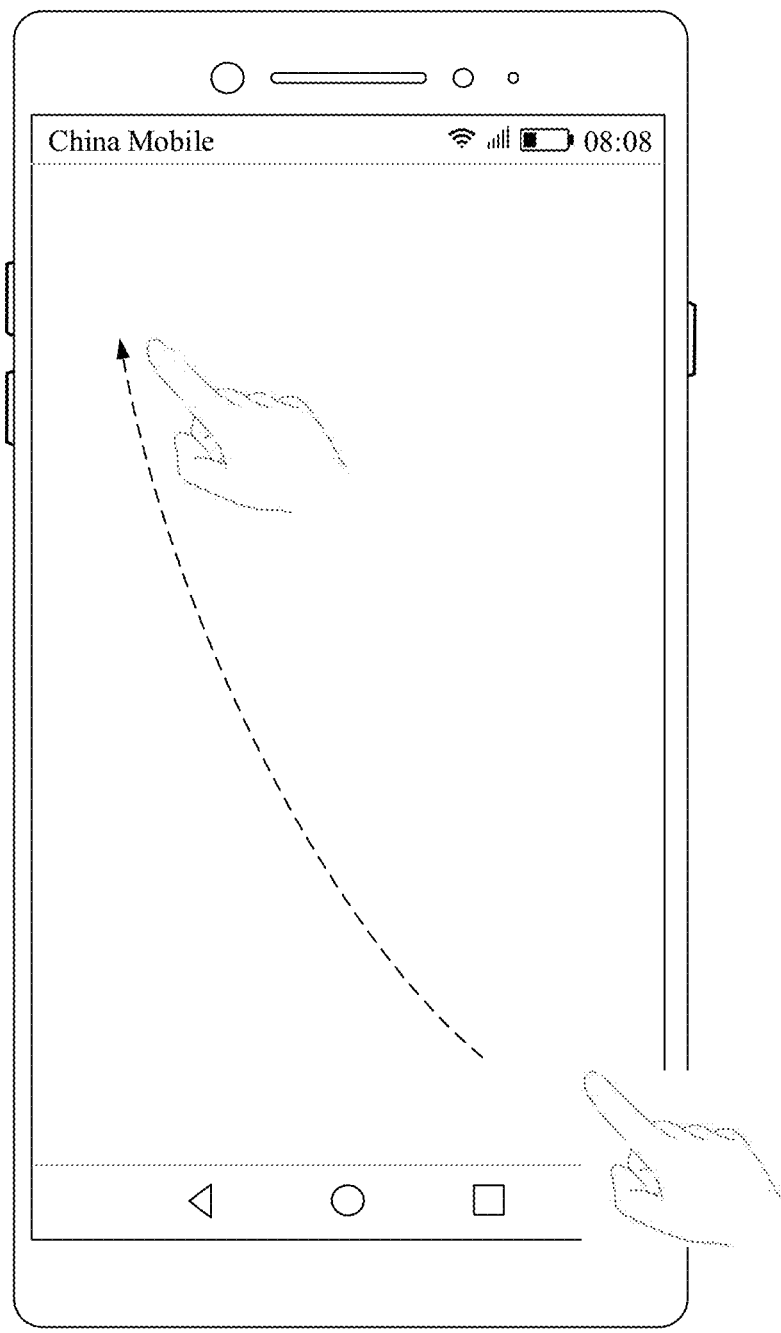
FIG. 7(a) is a schematic diagram of a touch operation in a control display method according to an embodiment of this application.
Figure 7B:
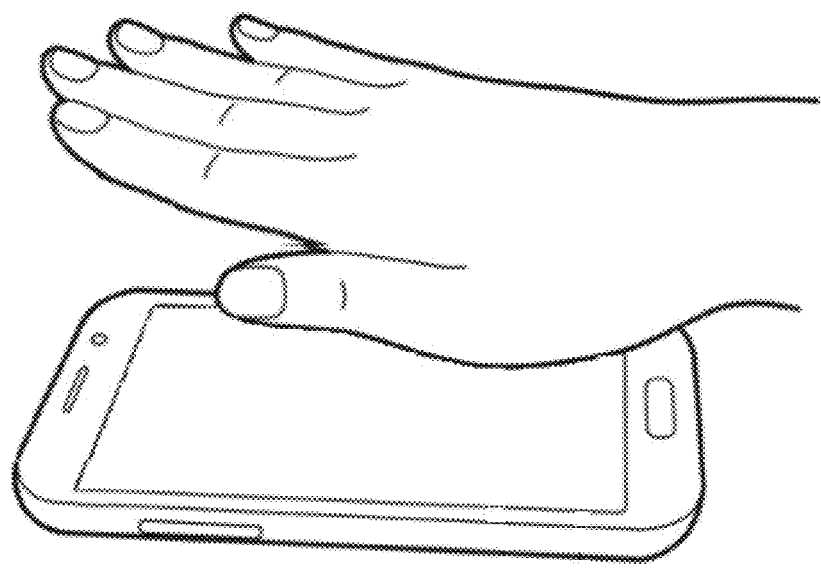
FIG. 7(b) is a schematic diagram of another touch operation in a control display method according to an embodiment of this application.

For example, the trigger operation for displaying the first floating window may be an air gesture operation shown in FIG. 7(*b*), and the air gesture operation is to place a palm of five fingers close together right above a display of the electronic device. In this case, when determining that the user performs the air gesture operation shown in FIG. 7(*b*), the electronic device displays the first floating window.

In addition, in another example, the first prompt icon may be further set at the upper layer of the first display interface of the first APP. In this case, the trigger operation for displaying the first floating window includes a tap operation for the first prompt icon. After receiving the tap operation for the first prompt icon, the electronic device displays the first floating window at the upper layer of the first display interface of the first APP, and displays the first control of the first APP through the first floating window.

Figure 8:
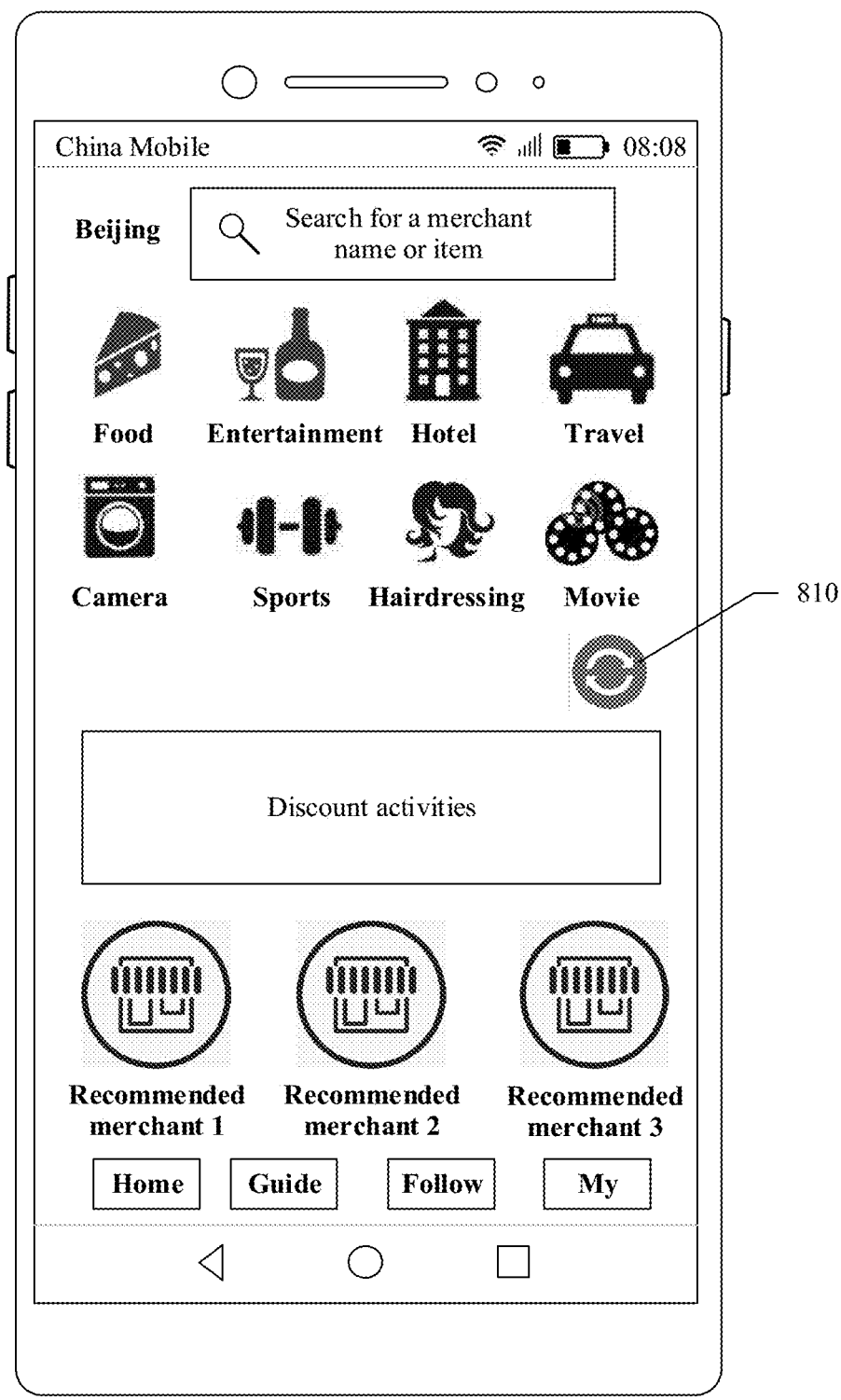
FIG. 8 is a schematic diagram of yet another interface in a control display method according to an embodiment of this application.

For example, when the first prompt icon is set at the upper layer of the first display interface, the first display interface of the first APP may be shown in FIG. 8. In FIG. 8, a first prompt icon 810 displayed in the first display interface of the first APP is included.

Compared with the first floating window, the first prompt icon occupies a smaller area, so that blocking caused to content displayed in the first display interface can be reduced. In addition, the first prompt icon can play a role of prompting the user, so that the user taps the first prompt icon when the first control needs to be displayed in the first floating window.

Certainly, the trigger operation for displaying the first floating window may alternatively be an operation in another form. This is not limited in this embodiment of this application.

In this scenario, the electronic device displays the first floating window at the upper layer of the first display interface of the first APP only after receiving the trigger operation, and displays, through the first floating window, the first control that is not included in the display interface of the first APP, to provide a large quantity of first controls for the user through the display interface of the first APP. This can reduce touch operations performed by the user on the first APP when the first control is required, that is, simplify user operations required to display the first control of the APP.

Further, in this scenario, the electronic device displays the first floating window only after receiving the trigger operation. Correspondingly, when the user does not require the first control displayed in the first floating window, the user does not perform the trigger operation on the electronic device, and the first floating window is not displayed at the upper layer of the first display interface. Therefore, in this scenario, when the user does not require the first control, the first floating window is not displayed on the first display interface, so that the first floating window can be prevented from blocking the display interface.

In addition, same as scenario 1, in scenario 2, when a large quantity of first controls can be displayed in the first floating window, the first controls may alternatively be displayed in the first floating window in a grouping manner. To be specific, a group of first controls and the first collapse icon are displayed in the first floating window, and another group of first controls are displayed when a touch operation for the first collapse icon is received.

Further, in this scenario, when displaying the first control of the first APP through the first floating window, the electronic device may also display the third control. The third control is usually displayed through the second floating window, and the first floating window and the second floating window may be a same floating window, or may be different floating windows. Therefore, when the user needs to operate the third control according to this embodiment of this application, the first APP does not need to be switched as a background operation. Compared with the method for displaying the third control in the conventional technology, this can simplify the user operations.

When the first floating window and the second floating window are different floating windows, the electronic device may display the second floating window while displaying the first floating window. When receiving a trigger operation for displaying the second floating window, the electronic device displays the second floating window. The trigger operation for displaying the second floating window may be a swipe operation, a voice input operation, and an air gesture operation that are for the touch area of the electronic device, a tap operation for a specified icon of the electronic device, or the like. This is not limited in this embodiment of this application.

For example, in this scenario, a schematic diagram of an interface displayed after the electronic device receives the trigger operation may alternatively be shown in any schematic diagram of FIG. 6(a) to FIG. 6(c).

In the foregoing description, different scenarios to which the control display method in this embodiment of this application is applied are disclosed. Certainly, the control display method disclosed in this embodiment of this application may alternatively be applied to another scenario. This is not limited in this embodiment of this application.

Figure 9:
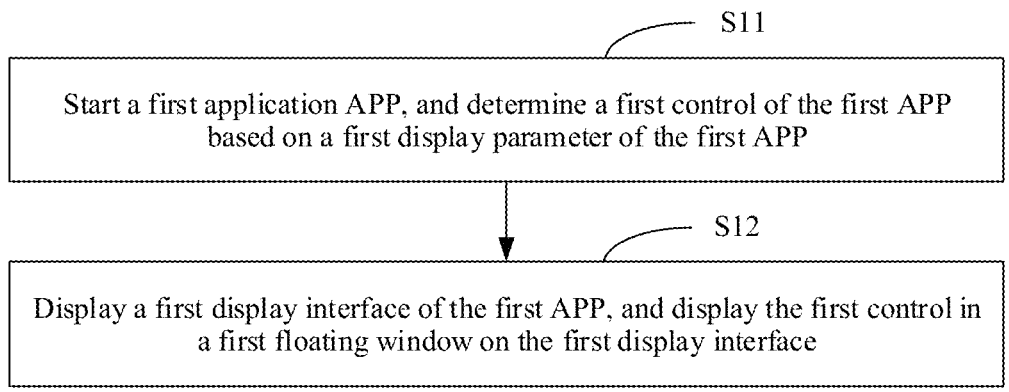
FIG. 9 is a schematic diagram of a working procedure of a control display method according to an embodiment of this application.

In the foregoing scenarios, the electronic device needs to display the first control of the first APP through the first floating window. Refer to a schematic diagram of a working procedure shown in FIG. 9. The control display method disclosed in this embodiment of this application includes the following steps.

Step S11: Start a first application APP, and determine a first control of the first APP based on a first display parameter of the first APP.

The first display parameter of the first APP includes at least one of the following: display permission for metadata corresponding to a control of the first APP, use frequency of the control of the first APP, a mapping relationship between a type of the first APP and the first control, and an interface identifier of the first display interface.

The interface identifier of the display interface is an identifier used to distinguish between different display interfaces, and different display interfaces have different identifiers. For example, the identifier of the display interface may include an interface element displayed in the display interface and/or content included in source code of the display interface. The interface element may be an icon, a menu, and/or text content.

Certainly, the interface identifier of the display interface may alternatively be another identifier that can be used to distinguish between different display interfaces. This is not limited in this embodiment of this application.

In addition, in step S11, an operation of starting the first APP is performed, and an operation of determining the first control of the first APP based on the first display parameter of the first APP is performed. In the control display method disclosed in this embodiment of this application, the two operations are not performed a strict time sequence.

For example, in this embodiment of this application, after the first APP is started, the first control of the first APP may be determined based on the first display parameter of the first APP. In this case, when another APP in the electronic device is not started, the electronic device does not need to determine a first control of the another APP. This can reduce workload of the electronic device.

In another example, before the first APP is started, the first control of the first APP may be determined based on the first display parameter of the first APP. For example, after the first APP is installed, the electronic device determines first control of the first APP. In this case, the first control of the first APP may be determined before the first APP is started. Therefore, compared with an operation of determining the first control after the first APP is started, an operation performed after the first APP is started is simplified, and a speed of displaying the first control in a first floating window is improved.

Step S12: Display a first display interface of the first APP, and display the first control in the first floating window on the first display interface.

The first control is different from a second control, and the second control is a control displayed in the first display interface.

The electronic device may determine controls of the first APP based on metadata that is of a component and included in an installation package of the first APP and metadata in the component. Specifically, the electronic device may determine names and icons of the controls of the first APP. In addition, when a control of the first APP is a function button used to enable or disable a function of the first APP, the electronic device may further determine a status of the control by interacting with the first APP. The status includes a function-enabled state and a function-disabled state.

A developer or a provider of the first APP sets, in the installation package of the first APP, corresponding display permission for metadata corresponding to each control that can be displayed in the first floating window, or creates a related file, and indicates, in the related file, that the metadata corresponding to each control that can be displayed in the first floating window has the display permission. The electronic device may determine display permission for the metadata of the component based on the related file. The electronic device may determine, based on the display permission for the metadata of the component, whether a corresponding control has the display permission.

Correspondingly, the first display parameter may include the display permission for the metadata corresponding to the control of the first APP. In this case, the electronic device determines the first control of the first APP based on the display permission for the metadata corresponding to the control of the first APP.

For example, the first display parameter of the first APP includes the display permission for the metadata corresponding to the control of the first APP, and the determining a first control of the first APP based on a first display parameter of the first APP includes the following steps:

first, determining that at least one control that is in the controls of the first APP and that corresponds to the metadata having the display permission is a first target control, where the first target control is a control corresponding to the metadata that has the display permission; and then, determining that a control that is in the at least one first target control and different from the second control is the first control of the first APP.

In this manner, the electronic device determines that the control corresponding to the metadata having the display permission is the first control of the first APP, and whether the metadata has the display permission may be set by the developer or the provider of the first APP. Therefore, the first control of the first APP may be determined based on a setting of the developer or provider of the first APP.

In addition, the first display parameter of the first APP may further include the use frequency of the control of the first APP. In this case, in this embodiment of this application, the determining a first control of the first APP based on a first display parameter of the first APP includes the following steps.

First, it is determined that at least one control that is in the controls of the first APP and whose use frequency is greater than a first threshold is a second target control, or it is determined that first n controls that are in the controls of the first APP and that are most frequently used are second target controls, where n is a specified positive integer. In a specific implementation process, the controls of the first APP may be sorted in descending order of use frequency, and the first n controls in the sorted controls are second target controls.

Then, it is determined that a control that is in the at least one second target control and different from the second control is the first control of the first APP.

In addition, in this implementation, the use frequency of the control of the first APP includes frequency of using the control of the first APP by users of different electronic devices, and/or frequency of using the control of the first APP by a current user of the electronic device.

If the use frequency of the control of the first APP includes the frequency of using the control of the first APP by different users, in a process of using the first APP, different electronic devices collect statistics on frequency of using different controls in the first APP by the users, and upload the use frequency to a server. The server collects statistics on use frequency of each user for different controls, and feeds back the use frequency to the electronic device.

For example, the use frequency that is of each control of the first APP and determined by the electronic device through the feedback of the server is shown in Table 1.

TABLE 1

| Control of first APP | Use frequency |
| --- | --- |
| New Message Alerts | 23 |
| Receive notifications for voice and video calls | 50 |
| Notification Center | 15 |
| Do Not Disturb Mode | 100 |
| Favorite files | 65 |

In addition, in this example, the electronic device determines that the control that is in the controls of the first APP and whose use frequency exceeds the first threshold is the second target control, where the first threshold is 20. In this case, the second target control includes the "Do Not Disturb Mode" control, the "Favorite files" control, the "Receive notifications for voice and video calls" control, and the "New Message Alerts" control. When none of the four second target controls are displayed in the first display interface, it may be determined that the four second target controls are first controls.

In this manner, because the first control can be determined based on the frequency of using the control of the first APP by the users of different electronic devices, the first control can comply with use habits of most users.

In addition, after the electronic device applies the first APP for a period of time, the electronic device may further use the frequency of using the control of the first APP by the current user of the electronic device as the use frequency of the control of the first APP. In this case, the electronic device may collect, in each use cycle, statistics on frequency of using each control of the first APP by the user, and determine the first control of the first APP based on the use frequency of each control of the first APP in the use cycle.

In this manner, because the first control can be determined based on the frequency of using the control of the first APP by the user of the electronic device, the determined first control relatively complies with a use habit of the user of the electronic device. This improves user experience.

Further, the use frequency of the control in the first APP may alternatively include both the frequency of using the control in the first APP by the users of different electronic devices and the frequency of using the control in the first APP by the current user of the electronic device. In this case, the electronic device may first determine the first control based on the frequency of using the control of the first APP by the users of different electronic devices, and display the first control through the first floating window set on the first display interface. Then, after the electronic device applies the first APP for a period of time, the electronic device may re-determine, in each use cycle, a first control based on the frequency of using the control of the first APP by the current user of the electronic device, and display the re-determined first control through the first floating window.

The use cycle may be set when the electronic device is delivered from a factory, and may alternatively be adjusted based on a received operation of the user. For example, the use cycle may be one week. Certainly, the use cycle may alternatively be other duration. This is not limited in this embodiment of this application.

In this manner, the electronic device can periodically determine the first control of the first APP, so that the first control meets a use requirement of the user, to further improve use experience of the user when applying the first APP.

When the first display parameter of the first APP includes the mapping relationship between the type of the first APP and the first control, the electronic device may further store the mapping relationship between the type of the APP and the first control. In this case, that the electronic device determines a first control of the first APP based on a first display parameter of the first APP includes the following steps:

first, determining at least one third target control based on the type of the first APP and the mapping relationship between the type of the first APP and the first control; and then, determining that a control that is in the at least one third target control and different from the second control is the first control of the first APP.

For example, mapping relationships between types of different APPs and first controls may be shown in Table 2.

TABLE 2

| APP type | First control (1) | First control (2) |
|---|---|---|
| Entertainment | Video Push | Do Not Disturb |
| Shopping and consumption | New Message Push | Favorites |
| Social communication | Gallery | Sticker Settings |

In Table 2, types of APPs are classified into types such as entertainment, shopping and consumption, and social communication. First controls corresponding to an entertainment APP may include a "Video Push" control and a "Do Not Disturb" control. First controls corresponding to a shopping and consumption APP may include a "New Message Push" control and a "Favorites" control. First controls corresponding to a social communication APP include a "Gallery" control and a "Sticker Settings" control. In this case, after determining the type of the first APP, the electronic device may query the mapping relationship to determine, based on the type of the first APP, the first control corresponding to the first APP.

Certainly, the APP may be further classified into another APP type. This is not limited in this embodiment of this application.

In addition, in this implementation, the electronic device may determine the type of the first APP in a plurality of manners. In one manner, when installing the first APP, the electronic device downloads the installation package of the first APP from an application market, and the application market classifies APPs into different types. Therefore, when downloading the installation package of the first APP, the electronic device may determine the type of the first APP by accessing the application market.

Alternatively, the electronic device may store a mapping relationship between a name and a type of each APP, and determine the type of the first APP based on the mapping relationship.

Further, the electronic device may further update, in a manner such as accessing the server or receiving a user input, the mapping relationship that is between the type of the first APP and the first control and stored in the electronic device.

In another exemplary implementation, the first display parameter of the first APP includes the interface identifier of the first display interface. The electronic device may determine a currently displayed interface of the first APP based on the interface identifier of the first display interface.

In this case, the determining a first control of the first APP based on a first display parameter of the first APP includes the following steps:

first, determining, based on the interface identifier of the first display interface, at least one fourth target control associated with the first display interface, where the at least one fourth target control is at least one control displayed in a lower-level display interface of the first display interface when the electronic device to which the first APP is applied displays the lower-level display interface of the first display interface; and then, determining that a control that is in the at least one fourth target control and different from the second control is the first control of the first APP.

The following describes a control associated with the first display interface with reference to an example. In this example, controls corresponding to display interfaces of the first APP are shown in FIG. 4(a). When the first display interface is a display interface in which a "Settings" control and a "Favorites" control are displayed, after a selection operation for the "Settings" control is received, the first APP displays a third display interface that includes a "Personal Information" control and a "Message and Push Notifications" control. After a selection operation for the "Personal Information" control is received, the first APP displays a fourth display interface including a "Profile Picture" control, a "Personal Information" control, and a "Delivery Address" control.

In addition, when the "Personal Information" control and the "Message and Push Notifications" control are displayed in the interface, if a selection operation for the "Message and Push Notifications" control is received, the first APP displays a fifth display interface including an "Activity Push" control, a "User Message Notifications" control, and a "Nearby Recommendations" control.

When the "Settings" control and the "Favorites" control are displayed in the interface, if a selection operation for the "Favorites" control is received, the first APP displays a sixth display interface including a "Merchants" control, a "Comments" control, and a "Group Buy" control.

In this case, the third display interface, the fourth display interface, the fifth display interface, and the sixth display interface are all lower-level display interfaces of the first display interface, and the controls included in the third display interface, the fourth display interface, the fifth display interface, and the sixth display interface are controls associated with the first display interface.

In this embodiment of this application, the electronic device may determine a data structure of the metadata of the component of the first APP based on the installation package of the first APP, and then determine, based on the data structure of the metadata of the component, at least one control associated with the first display interface.

The data structure of the metadata of the component may be a tree structure. In this case, the metadata corresponding to the control included in the first display interface is set as first metadata. In the data structure of the metadata of the component, a control corresponding to a lower-level node of the first metadata is a first control associated with the first display interface. Lower-level nodes of the first metadata are nodes that are in a branch of the tree structure in which the first metadata is located and that are passed through from a subnode of the first metadata to a terminal node of the branch, and include the subnode of the first metadata and the terminal node of the branch.

For example, when controls corresponding to display interfaces of the first APP are shown in FIG. 4(a), in the data structure of the metadata of the component, metadata corresponding to a "My" control is a parent node of metadata corresponding to a "Settings" control and metadata corresponding to a "Favorites" control. The metadata corresponding to the "Settings" control is a parent node of metadata corresponding to a "Personal Information" control and metadata corresponding to a "Message and Push Notifications" control. The metadata corresponding to the "Personal Information" control is a parent node of metadata corresponding to a "Profile Picture" control, metadata corresponding to a "Personal Information" control, and metadata corresponding to a "Delivery Address" control. The metadata corresponding to the "Message and Push Notifications" control is a parent node of metadata corresponding to an "Activity Push" control, metadata corresponding to a "User Message Notifications" control, and metadata corresponding to a "Nearby Recommendations" control. The metadata corresponding to the "Favorites" control is a parent node of metadata corresponding to a "Merchants" control, metadata corresponding to a "Comments" control, and metadata corresponding to a "Group Buy" control.

In this example, when the first display interface includes the "Settings" control and the "Message and Push Notifications" control, the metadata corresponding to the "Profile Picture" control, the metadata corresponding to the "Personal Information" control, the metadata corresponding to the "Delivery Address" control, the metadata corresponding to the "Activity Push" control, the metadata corresponding to the "User Message Notifications" control, and the metadata corresponding to the "Nearby Recommendations" control are lower-level nodes of the subnode of the first metadata. In this case, it may be determined that the "Profile Picture" control, the "Personal Information" control, the "Delivery Address" control, the "Activity Push" control, the "User Message Notifications" control, and the "Nearby Recommendations" control are fourth target controls associated with the first display interface.

In this method, the electronic device determines the first control of the first APP based on the interface identifier of the first display interface. In a process of applying the first APP, when the first APP displays the first display interface, if the user needs to touch a control associated with the first display interface, the user usually needs to perform at least one touch operation on the first APP, so that the first APP displays a display interface including the first control required by the user. However, according to this embodiment of this application, the first control associated with the first display interface may be displayed in the first floating window on the first display interface, to reduce touch operations of the user.

In addition, the electronic device may further determine the first control of the first APP based on at least two first display parameters. In this case, first controls corresponding to different first display parameters may be separately determined, and then a set or a union set of the first controls corresponding to different first display parameters is used as a first control displayed in the first floating window.

Figure 10:
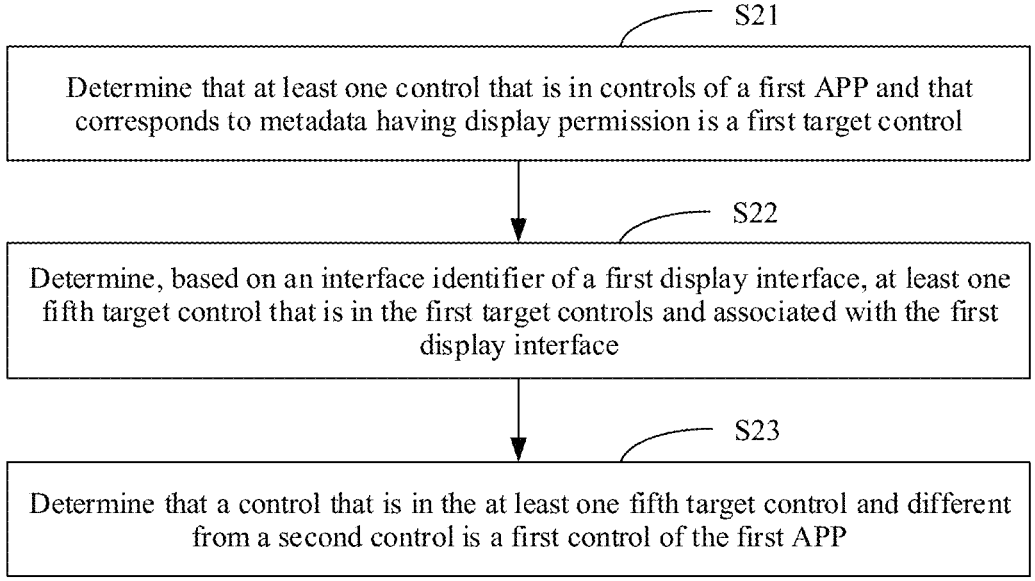
FIG. 10 is a schematic diagram of a working procedure of determining a first control of a first APP in a control display method according to an embodiment of this application.

In an exemplary implementation, the first display parameter of the first APP includes the display permission for the metadata corresponding to the control of the first APP and the interface identifier of the first display interface. In this case, refer to a schematic diagram of a working procedure shown in FIG. 10. That the electronic device determines a first control of the first APP based on a first display parameter of the first APP includes the following steps.

Step S21: Determine that at least one control that is in the controls of the first APP and that corresponds to metadata having the display permission is a first target control.

Step S22: Determine, based on the interface identifier of the first display interface, at least one fifth target control that is in the first target controls and associated with the first display interface.

The at least one fifth target control is a first target control displayed in a lower-level display interface of the first display interface when the electronic device to which the first APP is applied displays the lower-level display interface of the first display interface.

That is, in step S22, the first target control is screened based on the interface identifier of the first display interface, to determine the at least one fifth target control in the first target control.

Step S23: Determine that a control that is in the at least one fifth target control and different from the second control is the first control of the first APP.

By performing operations in step S21 to step S23, the electronic device can determine the first control of the first APP with reference to the display permission of the metadata corresponding to the control of the first APP and the interface identifier of the first display interface. The metadata corresponding to the first control determined in this manner has the display permission, and the first control is associated with the first display interface, so that the first control can meet the setting of the developer or the provider of the first APP, and when the user requires the first control associated with the first display interface, the first control associated with the first display interface can be displayed in the first floating window, to reduce touch operations of the user.

Figure 11:
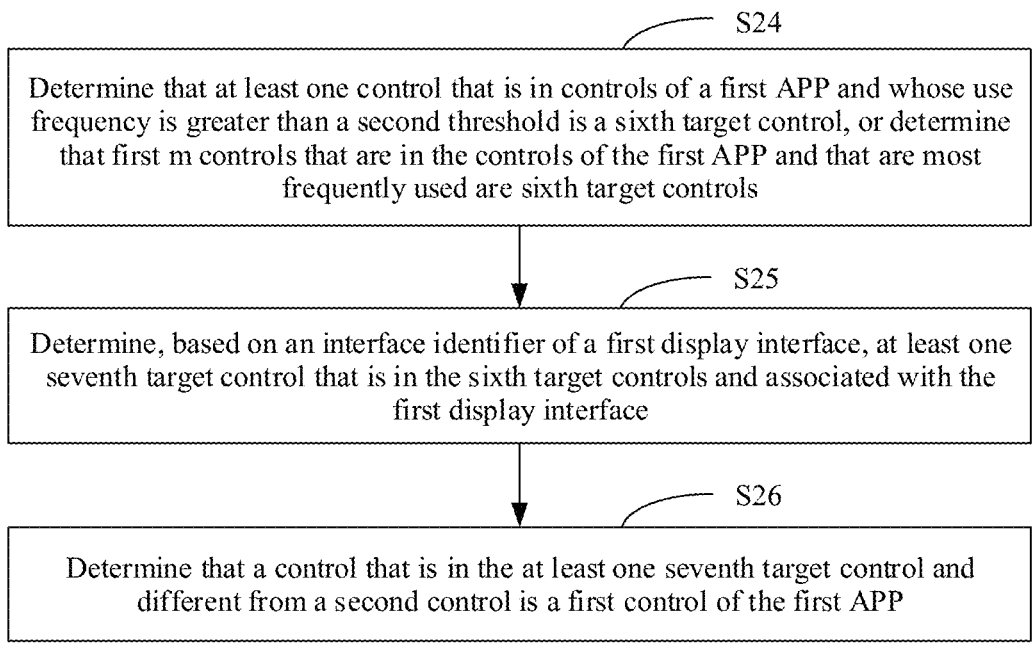
FIG. 11 is a schematic diagram of another working procedure of determining a first control of a first APP in a control display method according to an embodiment of this application.

In another exemplary implementation, the first display parameter of the first APP includes the use frequency of the control of the first APP and the interface identifier of the first display interface. In this case, refer to a schematic diagram of a working procedure shown in FIG. 11. That the electronic device determines a first control of the first APP based on a first display parameter of the first APP includes the following steps.

Step S24: Determine that at least one control that is in the controls of the first APP and whose use frequency is greater than a second threshold is a sixth target control, or determine that first m controls that are in the controls of the first APP and that are most frequently used are sixth target controls, where m is a specified positive integer.

The second threshold may be equal to or may not be equal to the first threshold, and m and n may be a same positive integer or may be different positive integers. This is not limited in this embodiment of this application.

In addition, the use frequency of the control of the first APP includes frequency of using the control of the first APP by users of different electronic devices, and/or frequency of using the control of the first APP by a current user of the electronic device.

Step S25: Determine, based on the interface identifier of the first display interface, at least one seventh target control that is in the sixth target controls and associated with the first display interface.

The at least one seventh target control is a sixth target control displayed in a lower-level display interface of the first display interface when the electronic device to which the first APP is applied displays the lower-level display interface of the first display interface.

Step S26: Determine that a control that is in the at least one seventh target control and different from the second control is the first control of the first APP.

By performing the operations in step S24 to step S26, the electronic device can determine the first control of the first APP with reference to the use frequency of the control of the first APP and the interface identifier of the first display interface. The first control determined in this manner is a control that is used frequently, so that a use habit of the user can be met. In addition, the first control is associated with the first display interface, so that when the user requires the first control associated with the first display interface, the first control associated with the first display interface can be displayed in the first floating window, to reduce touch operations of the user.

Figure 12:
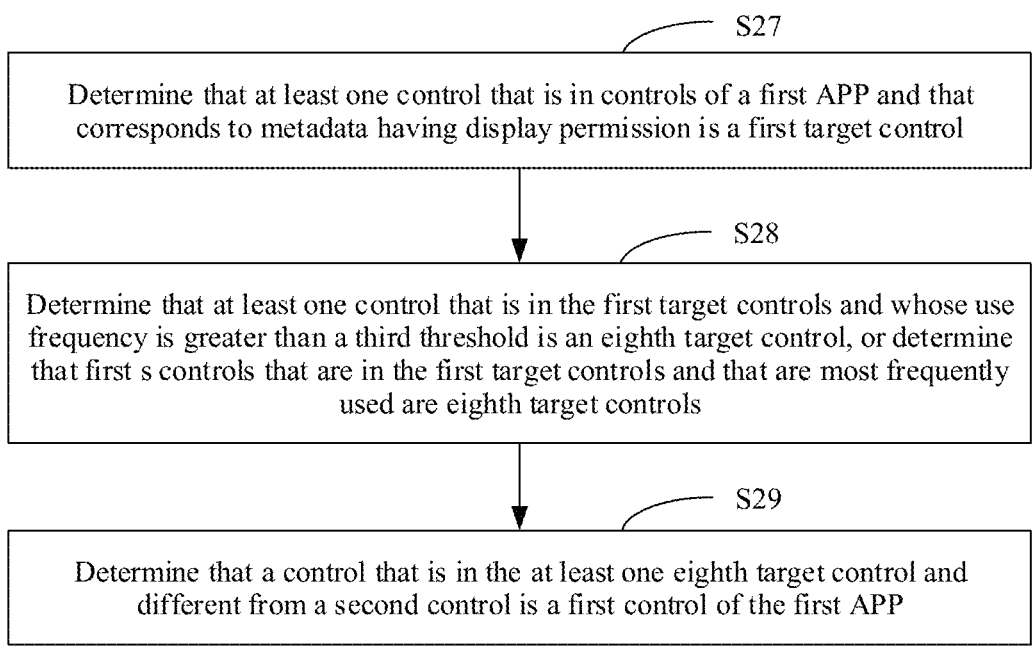
FIG. 12 is a schematic diagram of still another working procedure of determining a first control of a first APP in a control display method according to an embodiment of this application.

In another exemplary implementation, the first display parameter of the first APP includes the display permission for the metadata corresponding to the control of the first APP and the use frequency of the control of the first APP. In this case, refer to a schematic diagram of a working procedure shown in FIG. 12. That the electronic device determines a first control of the first APP based on a first display parameter of the first APP includes the following steps.

Step S27: Determine that at least one control that is in the controls of the first APP and that corresponds to metadata having the display permission is a first target control.

Step S28: Determine that at least one control that is in the first target controls and whose use frequency is greater than a third threshold is an eighth target control, or determine that first s controls that are in the first target controls and that are most frequently used are eighth target controls, where s is a specified positive integer.

The third threshold may be equal to or may not be equal to the first threshold, and s and n may be a same positive integer or may be different positive integers. This is not limited in this embodiment of this application.

Step S29: Determine that a control that is in the at least one eighth target control and different from the second control is the first control of the first APP.

By performing operations in step S27 to step S29, the electronic device can determine the first control of the first APP with reference to the display permission for the metadata corresponding to the control of the first APP and the use frequency of the control of the first APP. The metadata corresponding to the first control determined in this manner has the display permission, and the first control is a control that is used frequently, so that a use habit of the user can be met.

According to the foregoing implementation, the electronic device may determine the first control of the first APP based on the first display parameter, so that the first floating window can be displayed at the upper layer of the display interface of the first APP, and the first control of the first APP can be displayed through the first floating window.

In another embodiment of this application, after determining the first control of the first APP, the electronic device may automatically display the first control in the first floating window on the first display interface after starting the first APP. Alternatively, after a trigger operation for displaying the first floating window is received, the first control may be displayed in the first floating window on the first display interface.

The trigger operation for displaying the first floating window includes at least one of the following: a swipe operation for a touch area, an air gesture operation, a voice input operation, or a tap operation for a first prompt icon in the first display interface.

In addition, when the first control is a function button used to enable editing of a function of the first APP, a name and an icon of the first control are displayed in the first floating window. When the first control is a function button used to enable or disable a function of the first APP, the name of the first control is displayed in the first floating window, and the function is displayed as an enabled state or the function is displayed as a disabled state.

For example, when the first control of the first APP is shown in FIG. 5(a), after determining that the "User Message Notifications" control is the first control of the first APP, the electronic device may determine a status of the control by interacting with the first APP, and display a name and the corresponding status of the first control "User Message Notifications" in the first floating window.

In addition, after determining that the "Personal Information" control is a first control of the first APP, the electronic device may display a name and an icon of the first control "Personal Information" in the first floating window.

The first APP may implement a large quantity of functions, and correspondingly, the first APP may include a plurality of first controls. To prevent a display effect of the first display interface of the first APP from being affected by an excessive quantity of first controls that are displayed in the first floating window, the first controls may be divided into at least two groups, and one group of the first controls may be displayed in the first floating window.

In this case, in this embodiment of this application, after the first controls are determined, the first controls need to be grouped, and then the first controls are displayed in the first floating window based on a grouping status.

A quantity of the first controls is M, a maximum quantity of first controls displayed in the first floating window each time is N, and if M is greater than N, the displaying the first control in the first floating window on the first display interface includes the following steps:

step 1: sorting the first controls based on sorting parameters of the first controls;

step 2: displaying first N sorted first controls in the first floating window; and step 3: displaying more first controls in the first floating window after a tap operation for a first collapse icon in the first floating window is received.

M and N are specified positive integers. N may be a value preset by the electronic device, and the value of N may be further adjusted based on a setting operation of the user.

In addition, in step 2, when the first N sorted first controls are displayed in the first floating window, a sequence of the first N first controls being displayed in the first floating window may be further determined based on a sorting result of the first controls.

According to the foregoing steps, the electronic device can divide the first controls into at least two groups based on the sorting parameters, display one group of first controls in the first floating window, and display the first collapse icon in the first floating window. When a touch operation for the first collapse icon is received, the remaining group of first controls are selected and displayed in the first floating window.

When more first controls need to be displayed, the previously displayed first controls may be replaced with the remaining group of first controls. That is, only one group of first controls are displayed in the first floating window each time. When the last group of first controls are displayed in the first floating window, the electronic device adjusts the first collapse icon to a first return icon. After a touch operation for the first return icon is received, the previous group of first controls are displayed in the first floating window. Alternatively, when a touch operation for the first collapse icon is received, the currently displayed first controls and the remaining group of first controls may be simultaneously displayed in the first floating window.

In this manner, the first controls can be displayed in the first floating window in a grouping manner. A larger quantity of first controls displayed in the first floating window usually indicates a larger area of the first floating window. However, when the area of the first floating window is large, content in the display interface of the first APP may be blocked. However, the first controls are displayed in the first floating window in a grouping manner, so that a large quantity of first controls are not displayed in the first floating window each time. This reduces blocking of the display interface by the first floating window.

In this case, when the first floating window does not include the first control required by the user, the electronic device may adjust, by using a received touch operation for the first collapse icon, the first control displayed in the first floating window, so that the first control displayed in the first floating window meets the user requirement.

Further, in this case, if the first control required by the user is not displayed in the current first floating window, the user needs to perform a touch operation on the first collapse icon. However, in some cases, compared with the conventional technology, in a solution of this application, the user needs to perform only a small quantity of touch operations, and this can still simplify the user operations.

For example, when the first APP is a WeChat APP, a relationship between the control of the first APP and each control interface is shown in FIG. 5(a). When the user needs to perform an operation on a "Notification Center" control, the user needs to tap three controls in sequence: "Me", "Settings", and "Message Notifications", and then the "Notification Center" control is displayed in an interface of the WeChat APP, so that the user performs the operation on the "Notification Center" control. In other words, in the conventional technology, the electronic device may be enabled to display the "Notification Center" control only after the user taps three controls consecutively.

However, in this embodiment of this application, when the "Notification Center" control belongs to a first group of first controls displayed in the first floating window, the first control required by the user may be displayed in the first floating window without touching the first collapse icon by the user. When the "Notification Center" control belongs to a second group of first controls displayed in the first floating window, and the first group of first controls are displayed in the first floating window, the "Notification Center" control is displayed in the first floating window through only one touch operation performed by the user on the first collapse icon. When the "Notification Center" control belongs to a third group of first controls displayed in the first floating window, and the first group of first controls are displayed in the first floating window, the "Notification Center" control is displayed in the first floating window through only two touch operations performed by the user on the first collapse icon. Therefore, compared with the conventional technology, operations that need to be performed by the user are simplified.

In addition, in this embodiment of this application, the first controls are sorted based on the sorting parameters. The sorting parameter includes at least one of the following: a sequence of obtaining, by scanning the installation package of the first APP, metadata corresponding to the first control, use frequency of the first control, or a priority of the metadata corresponding to the first control. Correspondingly, the electronic device may sort the first controls in a plurality of manners.

In an exemplary implementation, the sorting parameter is the sequence of obtaining, by scanning the installation package of the first APP, the metadata corresponding to the first control. In this manner, when scanning the installation package of the first APP, the electronic device records a sequence of metadata of scanned components, and determines a display sequence of the first controls based on the sequence.

Specifically, it may be determined that a first control corresponding to metadata obtained earlier through scanning ranks higher in sorting. To be specific, the first control corresponding to the metadata obtained earlier through scanning is grouped into a first group of controls.

In this implementation, the electronic device determines a sequence of the first controls based on the sequence of the metadata obtained by scanning the installation package of the first APP. This implementation is convenient.

In another exemplary implementation, the sorting parameter includes the use frequency of the first controls. To be specific, the electronic device may determine, based on the use frequency of the first controls, a sequence of the first controls, namely, a display sequence in the first floating window. Usually, a sorting result of a first control that is used more frequently ranks higher in sorting.

For example, when the sorting parameter includes the use frequency of the first controls, and the use frequency of the controls of the first APP is shown in Table 1, the electronic device may determine that the sorting result of the first controls of the first APP is: "Do Not Disturb Mode" control, "Favorite files" control, "Receive notifications for voice and video calls" control, and "New Message Alerts" control.

In addition, when the electronic device periodically determines the use frequency of the first controls, the electronic device may alternatively determine the sequence of the first controls based on use frequency in each period, to periodically adjust the sequence of the first controls.

When the sequence of the first controls is determined based on the use frequency of the first controls, the sorting result of the first controls can meet a use habit of the user, to improve use experience of the user.

In another exemplary implementation, when a priority of metadata of each component is set in the installation package of the first APP, the electronic device may obtain the priority corresponding to each piece of metadata by scanning the installation package of the first APP. Alternatively, when a priority of metadata of each component is set in a related file, the electronic device may obtain the priority corresponding to each piece of metadata by parsing the related file.

In this case, the sorting parameter includes the priority of the metadata corresponding to the first control. The electronic device may determine the sorting result of the first controls based on priorities of metadata of the first controls. Specifically, a first control corresponding to metadata with a higher priority ranks higher in sorting.

For example, the first controls displayed in the first floating window by the first APP include: a "New Message Alerts" control, a "Receive notifications for voice and video calls" control, a "Notification Center" control, a "Do Not Disturb Mode" control, and a "Favorite files" control. The priorities of the metadata corresponding to the first controls are shown in Table 3.

TABLE 3

| First control | Priority |
| --- | --- |
| New Message Alerts | N1 |
| Receive notifications for voice and video calls | N2 |
| Notification Center | N3 |
| Do Not Disturb Mode | N4 |
| Favorite files | N5 |

In Table 3, the priorities represented by N1, N2, N3, N4, and N5 decrease sequentially. To be specific, the priorities corresponding to the first controls "New Message Alerts", "Receive notifications for voice and video calls", "Notification Center", "Do Not Disturb Mode", and "Favorite files" decrease sequentially. In addition, it is set that three first controls are displayed in the first floating window each time. In this case, the "New Message Alerts" control, the "Receive notifications for voice and video calls" control, and the "Notification Center" control may be grouped into a first group of controls, the "Do Not Disturb Mode" control and the "Favorites" control are grouped into a second group of controls, and the first group of controls are preferentially displayed. When the first controls are displayed, the first group of controls are first displayed in the first floating window. In addition, when the first group of controls are displayed, the first group of controls are displayed in a sequence of the "New Message Alerts" control, the "Receive notifications for voice and video calls" control, and the "Notification Center" control. To be specific, the "New Message Alerts" control is at a first location, the "Receive notifications for voice and video calls" control is at a middle location, and the "Notification Center" control is at a last location. In addition, after a tap operation for the first collapse icon is received, the second group of controls are displayed in the first floating window, and when the second group of controls are displayed, the "Do Not Disturb Mode" control is located before the "Favorites" control.

Figure 13:
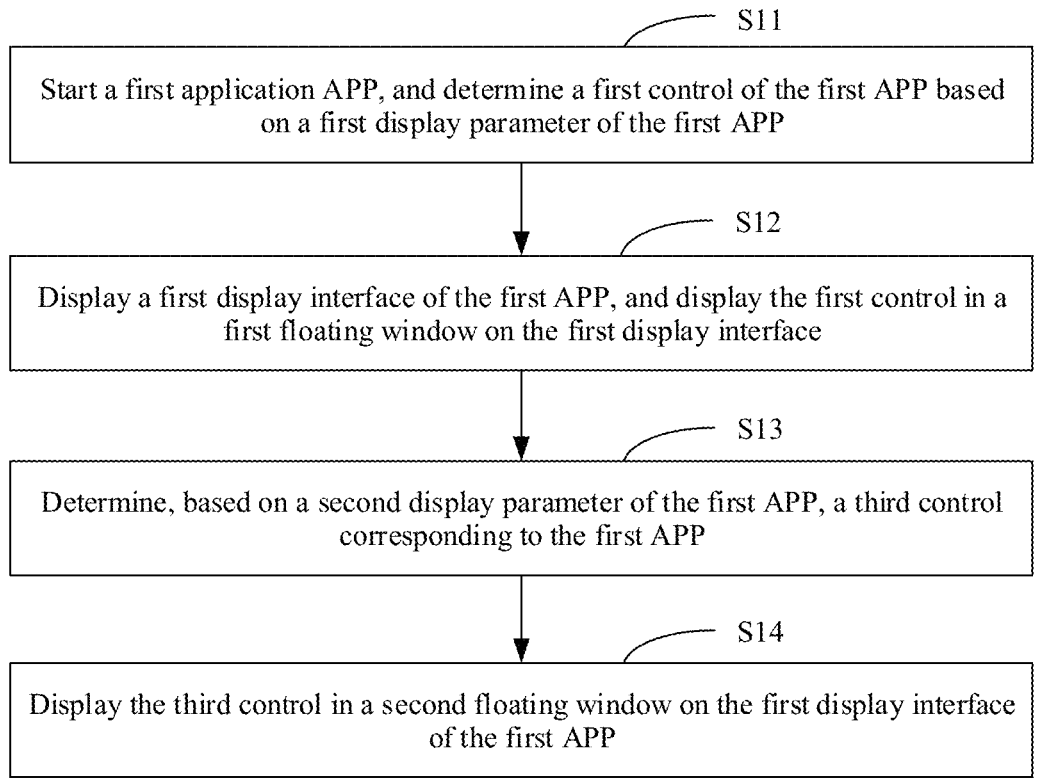
FIG. 13 is a schematic diagram of another working procedure of a control display method according to an embodiment of this application.

In addition, refer to a schematic diagram of a working procedure shown in FIG. 13. The control display method disclosed in this embodiment of this application further includes the following steps.

Step S13: Determine, based on a second display parameter of the first APP, a third control corresponding to the first APP, where the third control is a function button for controlling an operating system of the electronic device on which the first APP is installed.

Step S14: Display the third control in a second floating window on the first display interface of the first APP.

The first floating window and the second floating window may be a same floating window, or may be different floating windows. This is not limited in this embodiment of this application.

Figure 14:
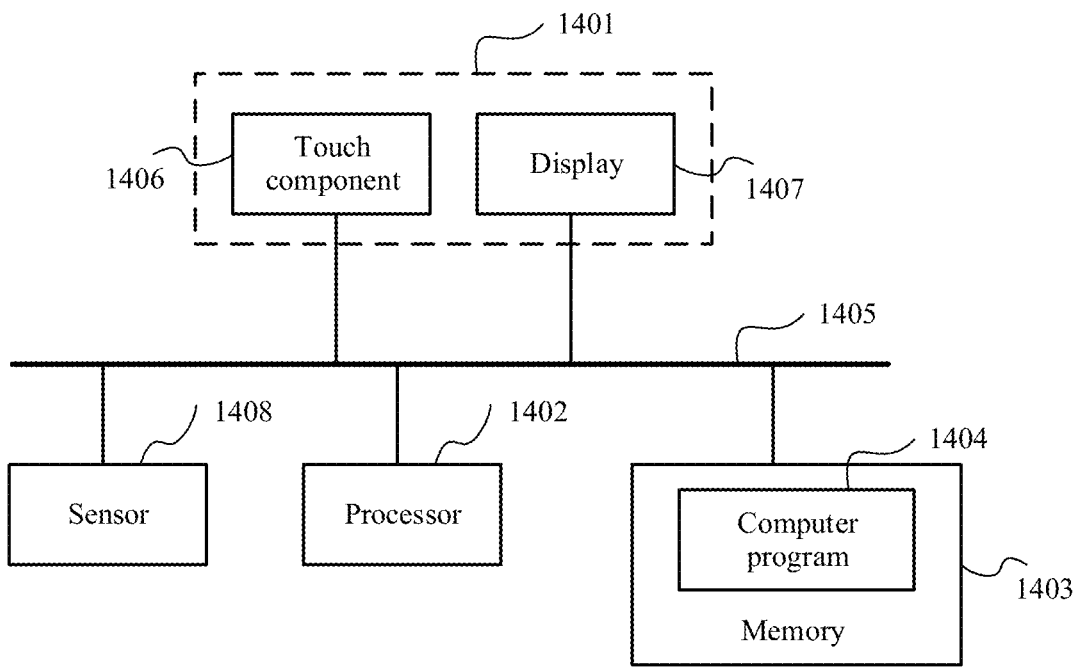
FIG. 14 is a schematic diagram of a structure of an electronic device according to an embodiment of this application.

In this embodiment of this application, step S11 and step S12 and step S13 and step S14 are not performed a strict time sequence. In the foregoing description and FIG. 14, step S13 and step S14 are performed after step S11 and step S12 are performed. In an actual application scenario, operations in step S12 and step S14 may be simultaneously performed. To be specific, the first control and the third control are simultaneously displayed in the floating window on the first display interface of the first APP.

The second display parameter includes at least one of the following: system permission of the first APP, a system function indicated by a component of the first APP, or a mapping relationship between the type of the first APP and the third control. Correspondingly, in this embodiment of this application, the electronic device may determine the third control in a plurality of manners.

In an exemplary implementation, the electronic device may determine the third control based on the system function indicated by the component of the first APP. To be specific, the second display parameter includes the system function indicated by the component of the first APP.

The electronic device may obtain the component of the first APP by scanning the installation package of the first APP. The component usually indicates a system function required by the electronic device. The system function required by the electronic device and indicated by the component of the first APP is a system function indicated by the component of the first APP.

The component of the first APP usually includes an intent-filter. The electronic device may determine that a function indicated by the intent-filter is a system function indicated by the component of the first APP. For example, the function indicated by the intent-filter includes a near field communication function. In this case, the electronic device may determine that the third control includes an "NFC" control.

In addition, the electronic device may further obtain the system permission (namely, a system privilege) of the first APP by scanning the installation package of the first APP, and then determine the third control based on the system permission. In this case, the second display parameter includes the system permission of the first APP. The system permission of the first APP is permission that needs to be provided by the operating system of the electronic device in a running process of the first APP.

For example, the first APP can run only after the electronic device is connected to a network. Therefore, the operating system of the electronic device provides network connection-related permission. In this case, the third control includes a "WLAN" control, and the "WLAN" control may be used to control whether the operating system of the electronic device is connected to a wireless network.

In another example, in the running process of the first APP, the operating system of the electronic device needs to provide location information. Correspondingly, the system permission of the first APP includes location permission, and the third control includes a "Location" control, for example, a "GPS" control. The "GPS" control is used to control whether the electronic device enables a GPS function, to implement locating.

The electronic device may obtain the system permission and the intent-filter of the first APP by scanning the installation package of the first APP. When the installation package is an installation package of an Android system, an application permission (namely, use-permission) statement usually indicates the system permission of the first APP, and the use-permission statement and the intent-filter are usually registered in a list file (namely, a manifest file) in the installation package. The electronic device may determine the system permission and the intent-filter by scanning the manifest file in the installation package.

In another exemplary implementation, the second display parameter includes the mapping relationship between the type of the first APP and the third control. In this manner, the electronic device may store the mapping relationship between the type of the APP and the third control, and determine, based on the type of the first APP, the third control corresponding to the first APP.

For example, the mapping relationship between the type of the APP and the third control may be shown in Table 4.

TABLE 4

| APP type | Third control (1) | Third control (2) |
|---|---|---|
| Entertainment | WLAN | Screen Recorder |
| Social communication | Sound | Screenshot |

In Table 4, the APP types are classified into entertainment and social communication. A third control corresponding to an entertainment APP may include a "WLAN" control and a "Screen Recorder" control. A third control corresponding to a social communication APP includes a "Sound" control and a "Screenshot" control. In this case, after determining the type of the first APP, the electronic device may determine the third control based on the type of the first APP by querying the mapping relationship.

Certainly, the APP may be further classified into another type. This is not limited in this embodiment of this application.

Further, the electronic device may further update, in a manner of accessing a server, receiving a user input, or the like, the mapping relationship that is between the type of the APP and the third control and stored in the electronic device.

In another exemplary implementation, the electronic device may alternatively determine the third control based on at least two second display parameters. In this case, the third control displayed in the display interface of the first APP may be a set or a union set of third controls determined based on different second display parameters.

In addition, there may be a plurality of third controls. Third controls determined by the electronic device may be displayed in the second floating window, or the electronic device may selectively display some of the third controls. In this embodiment of this application, the third control that needs to be displayed in the second floating window may be determined in a plurality of manners.

Further, when a large quantity of third controls are displayed in the second floating window, to avoid a case in which an excessively large area of the second floating window blocks the first display interface of the first APP, so that a display effect of the first display interface is affected, the third control may be displayed in the second floating window in a group display manner.

In this manner, a quantity of third controls that can be displayed in the second floating window each time is set to R, the third controls are divided into different groups, a quantity of third controls in each group is not greater than R, and a second collapse icon is further displayed in the second floating window. When none of the third controls displayed in the second floating window meet a requirement of the user, the user may tap the second collapse icon. After receiving a tap operation for the second collapse icon, the electronic device adjusts the third controls displayed in the second floating window, so that the second floating window displays another group of third controls that are not displayed before.

In addition, when the third controls are divided into different groups, the third controls may be sorted, and then the third controls are grouped based on a sorting result.

In this embodiment of this application, when the electronic device determines the third control based on the system permission of the first APP, in a process of scanning the installation package of the first APP, the electronic device further records a sequence of system permission obtained through scanning, and determines the sorting result of the third controls based on the sequence. Specifically, it may be determined that a third control corresponding to system permission obtained through scanning earlier ranks higher in the sorting result of the third controls.

Alternatively, when the electronic device determines the third control based on the system permission of the first APP, the developer, the provider, or the like of the first APP sets a priority of each system permission in the installation package of the first APP, or creates a related file including the priority of each system permission, and packs the installation package and the related file into a file package. When downloading the installation package of the first APP, the electronic device also obtains the related file.

In this case, the electronic device may obtain, by scanning the installation package of the first APP, the priority corresponding to each system permission, or may obtain, by parsing the related file, the priority corresponding to each system permission. Then, the electronic device may determine the sorting result of the third controls based on the priority. Specifically, a third control corresponding to system permission with a higher priority ranks higher in the sorting result of the third controls.

In another implementation, different electronic devices may collect statistics on frequency of using different third controls by users of the electronic devices, and upload the use frequency to a server. The server collects statistics on frequency of using the third control by the users of different electronic devices, and feeds back a statistical result to the electronic device. Then, the electronic device determines the sorting result of the third controls based on feedback from the server. Usually, a third control that is used more frequently ranks higher in the sorting result of the third controls.

Further, after the user uses the first APP for a period of time, the electronic device may further adjust the sorting result of the third controls based on a use habit of the user. In this manner, the electronic device collects frequency of using the third controls by the user, and then adjusts the sorting result of the third controls based on the use frequency. Usually, a third control that is used by the user more frequently ranks higher in the sorting result of the third controls.

Embodiments of this application further provide an electronic device. Refer to a schematic structural diagram of an electronic device shown in FIG. 14. The electronic device includes a screen 1401 including a touch component 1406 and a display 1407, one or more processors 1402, one or more memories 1403, one or more applications, and one or more computer programs 1404. The foregoing components may be connected through one or more communication buses 1405. The one or more computer programs 1404 are stored in the memory 1403 and are configured to be executed by the one or more processors 1402. The one or more computer programs 1404 include instructions, and the instructions may be used to perform the steps in the foregoing embodiments. To be specific, when the instructions are executed by the one or more processors, the electronic device performs a control display method disclosed in the foregoing embodiments of this application. All related content of the steps in the foregoing method embodiments may be referred to in function descriptions of corresponding physical components. Details are not described herein again.

Further, the electronic device may further include one or more sensors 1408.

For example, the processor 1402 may be specifically the processor 110 shown in FIG. 1, the memory 1403 may be specifically the internal memory 121 and/or the external memory interface 120 shown in FIG. 2, the screen 1401 may be specifically the flexible screen shown in FIG. 1, and the sensor 1408 may be specifically the gyroscope sensor 180B, the acceleration sensor 180E, or the optical proximity sensor 180G that is in the sensor module 180 shown in FIG. 2, or may be one or more of an infrared sensor, a Hall effect sensor, or the like. This is not limited in this embodiment of this application.

Correspondingly, an embodiment of this application further provides a computer-readable storage medium. The computer-readable storage medium stores instructions. When the instructions are run on an electronic device, the electronic device is enabled to perform a control display method disclosed in the foregoing embodiments of this application.

Correspondingly, an embodiment of this application further provides a computer program product including instructions. When the computer program product runs on an electronic device, the electronic device is enabled to perform a control display method disclosed in the foregoing embodiments of this application.

The various illustrative logical units and circuits described in the embodiments of this application may implement or operate the described functions by using a general-purpose processor, a digital information processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital information processor and a microprocessor, a plurality of microprocessors, one or more microprocessors with a digital information processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an erasable programmable ROM (EPROM), an electrically erasable programmable ROM (EEPROM), a register, a hard disk drive, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be disposed in an ASIC, and the ASIC may be disposed in a user equipment (UE). Optionally, the processor and the storage medium may be arranged in different components of the UE.

It should be understood that sequence numbers of the foregoing processes do not necessarily mean an execution sequence in various embodiments of this application. The execution sequence of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement embodiments, all or a part of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk, or a magnetic tape), an optical medium (for example, a DVD), a semiconductor medium (for example, a solid state disk (SSD)), or the like.

Embodiments in this specification are all described in a progressive manner, for same or similar parts in embodiments, refer to these embodiments, and each embodiment focuses on a difference from other embodiments. Apparatus and system embodiments may be similar to a method embodiment, and therefore are described briefly; for related parts, refer to partial descriptions in the method embodiment.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

A person skilled in the art may clearly understand that, technologies in embodiments of the present invention may be implemented by software in addition to a hardware platform. Based on such an understanding, technical solutions of embodiments of the present invention may be implemented in a form of a software product. The computer software product is stored in a storage medium, such as a ROM/RAM, a hard disk, or an optical disc, and includes several instructions for instructing a computer device (which may be a personal computer, a server, or a network device) to perform the methods described in embodiments or some parts of embodiments of the present invention.

For same or similar parts in embodiments of this specification, refer to each other. An embodiment of an electronic device may be similar to a method embodiment, and therefore may be described briefly. For related parts, refer to descriptions in the method embodiment.

The foregoing implementations of the present invention do not constitute any limitation on the protection scope of the present invention.

What is claimed is:

1. A control display method, comprising:
starting, by an electronic device, a first application (APP);
determining, by the electronic device, a first control of the first APP based on a first display parameter of the first APP, wherein the first display parameter of the first APP comprises at least one of the following: display permission for metadata corresponding to a control of the first APP, use frequency of the control of the first APP, a mapping relationship between a type of the first APP and the first control, or an interface identifier of a first display interface;
displaying, by the electronic device, the first display interface of the first APP; and
displaying, by the electronic device, the first control in a first floating window on the first display interface, wherein the first control is different from a second control, and the second control is a control displayed in the first display interface.

2. The method according to claim 1, wherein the first control is a function button which enables editing of a function of the first APP; and
wherein displaying the first control in the first floating window on the first display interface of the first APP comprises: displaying a name and an icon of the first control in the first floating window.

3. The method according to claim 1, wherein the first control is a function button which enables or disables a function of the first APP; and
wherein displaying the first control in the first floating window on the first display interface of the first APP comprises: displaying a name of the first control in the first floating window, and displaying the function in an enabled state or displaying the function in a disabled state.

4. The method according to claim 1, further comprising:
determining, based on a second display parameter of the first APP, a third control corresponding to the first APP, wherein the third control is a function button for controlling an operating system of the electronic device; and
displaying the third control in a second floating window on the first display interface of the first APP.

5. The method according to claim 4, wherein the second display parameter comprises at least one of the following: system permission of the first APP, a system function indicated by a component of the first APP, or a mapping relationship between the type of the first APP and the third control.

6. The method according to claim 1, wherein the first display parameter of the first APP comprises the display permission for the metadata corresponding to the control of the first APP; and
wherein determining the first control of the first APP based on the first display parameter of the first APP comprises:
determining that at least one control of controls of the first APP and that corresponds to metadata having the display permission is at least one first target control; and
determining that a control of the at least one first target control that is different from the second control is the first control of the first APP.

7. The method according to claim 1, wherein the first display parameter of the first APP comprises the use frequency of the control of the first APP; and
wherein determining the first control of the first APP based on the first display parameter of the first APP comprises:
determining that at least one control of controls of the first APP and whose use frequency is greater than a first threshold is at least one second target control; and
determining that a control of the at least one second target control that is different from the second control is the first control of the first APP.

8. The method according to claim 1, wherein the first display parameter of the first APP comprises the use frequency of the control of the first APP; and
wherein determining the first control of the first APP based on the first display parameter of the first APP comprises:
determining that first n controls of controls of the first APP and that are most frequently used are second target controls, wherein n is a specified positive integer; and
determining that a control of the second target controls that is different from the second control is the first control of the first APP.

9. The method according to claim 1, wherein the first display parameter of the first APP comprises the mapping relationship between the type of the first APP and the first control; and
wherein determining the first control of the first APP based on the first display parameter of the first APP comprises:
determining at least one third target control based on the type of the first APP and the mapping relationship between the type of the first APP and the first control; and
determining that a control of the at least one third target control that is different from the second control is the first control of the first APP.

10. The method according to claim 1, wherein the first display parameter of the first APP comprises the interface identifier of the first display interface; and
wherein determining the first control of the first APP based on the first display parameter of the first APP comprises:
determining, based on the interface identifier of the first display interface, at least one fourth target control associated with the first display interface, wherein the at least one fourth target control is displayable in a lower-level display interface of the first display interface; and
determining that a control of the at least one fourth target control that is different from the second control is the first control of the first APP.

11. The method according to claim 1, wherein the first display parameter of the first APP comprises the display permission for the metadata corresponding to the control of the first APP and the interface identifier of the first display interface; and
wherein determining the first control of the first APP based on the first display parameter of the first APP comprises:
determining that at least one control of controls of the first APP and that corresponds to metadata having the display permission is at least one first target control;
determining, based on the interface identifier of the first display interface, at least one fifth target control of the at least one first target control and that is associated with the first display interface, wherein the at least one fifth target control is displayable in a lower-level display interface of the first display interface; and
determining that a control of the at least one fifth target control that is different from the second control is the first control of the first APP.

12. The method according to claim 1, wherein the first display parameter of the first APP comprises the use frequency of the control of the first APP and the interface identifier of the first display interface; and
wherein determining the first control of the first APP based on the first display parameter of the first APP comprises:
determining that at least one control of controls of the first APP and whose use frequency is greater than a second threshold is at least one sixth target control; and
determining, based on the interface identifier of the first display interface, at least one seventh target control of the at least one sixth target control and that is associated with the first display interface, wherein the at least one seventh target control is displayable in a lower-level display interface of the first display interface; and
determining that a control of the at least one seventh target control that is different from the second control is the first control of the first APP.

13. The method according to claim 1, wherein the first display parameter of the first APP comprises the use frequency of the control of the first APP and the interface identifier of the first display interface; and
  wherein determining the first control of the first APP based on the first display parameter of the first APP comprises:
    determining first m controls of controls of the first APP and that are most frequently used are sixth target controls, wherein m is a specified positive integer; and
    determining, based on the interface identifier of the first display interface, at least one seventh target control of the sixth target controls and that is associated with the first display interface, wherein the at least one seventh target control is displayable in a lower-level display interface of the first display interface; and
    determining that a control of the at least one seventh target control that is different from the second control is the first control of the first APP.

14. The method according to claim 1, wherein the first display parameter of the first APP comprises the display permission for the metadata corresponding to the control of the first APP and the use frequency of the control of the first APP; and
  wherein determining the first control of the first APP based on the first display parameter of the first APP comprises:
    determining that at least one control of controls of the first APP and that corresponds to metadata having the display permission is at least one first target control;
    determining that at least one control of the at least one first target control and whose use frequency is greater than a third threshold is at least one eighth target control; and
    determining that a control of the at least one eighth target control that is different from the second control is the first control of the first APP.

15. The method according to claim 1, wherein the first display parameter of the first APP comprises the display permission for the metadata corresponding to the control of the first APP and the use frequency of the control of the first APP; and
  wherein determining the first control of the first APP based on the first display parameter of the first APP comprises:
    determining that at least one control of controls of the first APP and that corresponds to metadata having the display permission is at least one first target control;
    determining that first s controls of the at least one first target control and that are most frequently used are eighth target controls, wherein s is a specified positive integer; and
    determining that a control of the eighth target controls that is different from the second control is the first control of the first APP.

16. The method according to claim 1, wherein before displaying the first control in the first floating window on the first display interface of the first APP, the method further comprises:
  receiving a trigger operation for displaying the first floating window, wherein the trigger operation for displaying the first floating window comprises at least one of the following: a swipe operation for a touch area, an air gesture operation, a voice input operation, or a tap operation for a first prompt icon in the first display interface.

17. The method according to claim 1, wherein a quantity of first controls is M, a maximum quantity of first controls displayable in the first floating window at a time is N, and based on M being greater than N, the method further comprises:
  sorting the first controls based on sorting parameters of the first controls;
  displaying first N sorted first controls in the first floating window; and
  displaying more first controls in the first floating window after a tap operation for a first collapse icon in the first floating window is received.

18. The method according to claim 17, wherein the sorting parameters comprise at least one of the following: a sequence of obtaining, by scanning an installation package of the first APP, metadata corresponding to the first control, use frequency of the first control, or a priority of the metadata corresponding to the first control.

19. An electronic device, comprising:
  one or more processors; and
  one or more memories having processor-executable instructions stored thereon;
  wherein the one or more processors are configured to execute the processor-executable instructions to facilitate the following being performed by the electronic device:
  starting a first application (APP);
  determining a first control of the first APP based on a first display parameter of the first APP, wherein the first display parameter of the first APP comprises at least one of the following: display permission for metadata corresponding to a control of the first APP, use frequency of the control of the first APP, a mapping relationship between a type of the first APP and the first control, or an interface identifier of a first display interface;
  displaying the first display interface of the first APP; and
  displaying the first control in a first floating window on the first display interface, wherein the first control is different from a second control, and the second control is a control displayed in the first display interface.

20. A non-transitory computer-readable storage medium having processor-executable instructions stored thereon, wherein the processor-executable instructions, when executed, facilitate performance of the following by an electronic device:
  starting a first application (APP);
  determining a first control of the first APP based on a first display parameter of the first APP, wherein the first display parameter of the first APP comprises at least one of the following: display permission for metadata corresponding to a control of the first APP, use frequency of the control of the first APP, a mapping relationship between a type of the first APP and the first control, or an interface identifier of a first display interface;
  displaying the first display interface of the first APP; and
  displaying the first control in a first floating window on the first display interface, wherein the first control is different from a second control, and the second control is a control displayed in the first display interface.

* * * * *